(12) United States Patent
Kim et al.

(10) Patent No.: US 9,713,197 B2
(45) Date of Patent: Jul. 18, 2017

(54) APPARATUS AND METHOD FOR MANAGING RADIO RESOURCE CONTROL CONNECTION IN WIRELESS COMMUNICATION SYSTEM SUPPORTING DEVICE TO DEVICE SCHEME

(71) Applicant: Samsung Electronics Co., Ltd., Gyeonggi-do (KR)

(72) Inventors: Kyung-Kyu Kim, Suwon-si (KR); Anil Agiwal, Bangalore (IN); Young-Bin Chang, Anyang-si (KR)

(73) Assignee: SAMSUNG ELECTRONICS CO., LTD., Suwonsi (KR)

( * ) Notice: Subject to any disclaimer, the term of this patent is extended or adjusted under 35 U.S.C. 154(b) by 133 days.

(21) Appl. No.: 14/698,565

(22) Filed: Apr. 28, 2015

(65) Prior Publication Data

US 2015/0312960 A1 Oct. 29, 2015

(30) Foreign Application Priority Data

Apr. 28, 2014 (KR) ........................ 10-2014-0051025

(51) Int. Cl.
*H04W 72/04* (2009.01)
*H04W 76/06* (2009.01)
(Continued)

(52) U.S. Cl.
CPC ........... *H04W 76/06* (2013.01); *H04W 72/04* (2013.01); *H04W 76/023* (2013.01); *H04L 5/003* (2013.01); *H04L 5/0078* (2013.01)

(58) Field of Classification Search
None
See application file for complete search history.

(56) References Cited

U.S. PATENT DOCUMENTS

2012/0289232 A1* 11/2012 Ostrup ................ H04W 76/068
455/436
2013/0163537 A1* 6/2013 Anderson ......... H04W 72/1284
370/329

(Continued)

OTHER PUBLICATIONS

3GPP TSG RAN WG2 #85; "TP for TR 36.843 capturing agreements from RAN2 #85"; R2-141008; Prague, Czech Republic; Feb. 10-14, 2014; 7 pages.

(Continued)

*Primary Examiner* — Chi H Pham
*Assistant Examiner* — Shick Hom

(57) ABSTRACT

A method to manage a Radio Resource Control (RRC) connection in an evolved NodeB (eNB) in a wireless communication system supporting a Device to Device (D2D) scheme is provided. The method includes starting an inactivity timer to control a User Equipment (UE) to transition into an RRC idle state after setting up an RRC connection with the UE. The method also includes allocating a D2D resource to the UE when a resource request message to request the D2D resource for a direct communication between UEs is received from the UE. The method further includes transmitting a resource response message including information related to the allocated D2D resource to the UE and stopping the inactivity timer. The method includes releasing the allocated D2D resource and restarting the inactivity timer based on a predetermined option.

20 Claims, 22 Drawing Sheets

(51) Int. Cl.
*H04W 76/02* (2009.01)
*H04L 5/00* (2006.01)

(56) References Cited

U.S. PATENT DOCUMENTS

2013/0322276 A1* 12/2013 Pelletier .............. H04W 72/085
370/252
2014/0185558 A1* 7/2014 Yi ........................ H04W 24/08
370/329

OTHER PUBLICATIONS

3GPP TR 36.843 V1.0.0; Technical Specification Group RAN; "Study on LTE Device to Device Proximity Services-Radio Aspects"; Release 12; Nov. 2013; 32 pages.
3GPP TR 36.331 V10.0.0; Technical Specification Group RAN; "Evolved Universal Terrestrial Radio Access (E-UTRA); Radio Resource Control (RRD); Protocol specification"; Release 10; Dec. 2010; 276 pages.

* cited by examiner

APPARATUS AND METHOD FOR MANAGING RADIO RESOURCE CONTROL CONNECTION IN WIRELESS COMMUNICATION SYSTEM SUPPORTING DEVICE TO DEVICE SCHEME

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Apr. 28, 2014 assigned Serial No. 10-2014-0051025, the entire disclosure of which is incorporated herein by reference.

TECHNICAL FIELD

The present disclosure relates to an apparatus and method for managing a Radio Resource Control (RRC) connection in a wireless communication system, and more particularly, to an apparatus and method for managing an RRC connection in a wireless communication system supporting a Device to Device (D2D) scheme.

BACKGROUND

Generally, a scheme for a wireless communication for a close distance is referred to as a near field wireless communication scheme, and a typical example of a near field wireless communication which is based on the near field wireless communication scheme is a D2D communication that a direct communication is performed between devices without passing a network entity such as an evolved NodeB (eNB), and the like. In the D2D communication, a User Equipment (UE) acquires synchronization with neighbor UEs, and performs a discovery operation that the UE discovers the neighbor UEs using a preset resource during time which is preset by an eNB. The UE acquires information about the neighbor UEs using the discovery operation. For example, the information about the neighbor UEs includes UE identification information, interest information, application program information, and the like.

SUMMARY

To address the above-discussed deficiencies, it is a primary object to provide, for use in an apparatus and method for managing an RRC connection in a wireless communication system supporting a D2D scheme.

In an embodiment an apparatus and method for managing an inactivity timer related to an RRC idle state of a UE in an eNB in a wireless communication system supporting a D2D scheme is provided. An apparatus and method for preventing frequent RRC state changes which occur in a case that a UE performs a discovery operation in a wireless communication system supporting a D2D scheme is provided. An apparatus and method for preventing frequent RRC state changes which occur in a case that a UE performs a discovery operation thereby effectively managing an RRC connection between an eNB and a UE in a wireless communication system supporting a D2D scheme is provided.

In a first example, a method to manage a Radio Resource Control (RRC) connection in an evolved NodeB (eNB) in a wireless communication system supporting a Device to Device (D2D) scheme is provided. The method includes starting an inactivity timer to control a User Equipment (UE) to transition into an RRC idle state after setting up an RRC connection with the UE. The method also includes allocating a D2D resource to the UE when a resource request message to request the D2D resource for a direct communication between UEs is received from the UE. The method further includes transmitting a resource response message including information related to the allocated D2D resource to the UE and stop the inactivity timer. The method includes releasing the allocated D2D resource and restarting the inactivity timer based on a predetermined option.

In a second example, a method to manage a Radio Resource Control (RRC) connection in an evolved NodeB (eNB) in a wireless communication system supporting a Device to Device (D2D) scheme is provided. The method includes starting an inactivity timer to control a User Equipment (UE) to transition into an RRC idle state after setting up an RRC connection with the UE. The method also includes allocating a D2D resource to the UE when a resource request message to request the D2D resource for a direct communication between UEs is received from the UE. The method further includes transmitting a resource response message including information related to the allocated D2D resource to the UE. The method includes releasing the RRC connection based on a predetermined option.

In a third example, a method to manage a Radio Resource Control (RRC) connection in an evolved NodeB (eNB) in a wireless communication system supporting a Device to Device (D2D) scheme is provided. The method includes starting a first inactivity timer to control a User Equipment (UE) to transition into an RRC idle state after setting up an RRC connection with the UE. The method also includes allocating a D2D resource to the UE when a resource request message to request the D2D resource for a direct communication between UEs is from the UE. The method further includes transmitting a resource response message including information related to the allocated D2D resource to the UE. The method includes releasing the RRC connection based on a predetermined option.

In a fourth example, an evolved NodeB (eNB) in a wireless communication system supporting a Device to Device (D2D) scheme is provided. The eNB includes a receiver configured to receive a resource request message to request a D2D resource for a direct communication between User Equipments (UEs) from a UE. The eNB also includes a controller configured to start an inactivity timer to control the UE to transition into a Radio Resource Control (RRC) idle state after setting up an RRC connection with the UE. The controller is also configured to allocate a D2D resource to the UE when the resource request message is received. The controller is further configured to stop the inactivity timer when a resource response message including information related to the allocated D2D resource is transmitted. The controller is configured to release the allocated D2D resource and restart the inactivity timer based on a predetermined option. The eNB further includes a transmitter configured to transmit the resource response message to the UE.

In a fifth example, an evolved NodeB (eNB) in a wireless communication system supporting a Device to Device (D2D) scheme is provided. The eNB includes a receiver configured to receive a resource request message to request a D2D resource for a direct communication between User Equipments (UEs) from a UE. The eNB also includes a controller configured to start an inactivity timer to control the UE to transition into a Radio Resource Control (RRC) idle state after setting up an RRC connection with the UE. The controller is also configured to allocate the D2D resource to the UE when the resource request message is received. The controller is further configured to release the RRC connection based on a predetermined option when a resource response message including information related to the allocated D2D resource is transmitted. The eNB further includes a transmitter configured to transmit the resource response message to the UE.

In a fifth example, an evolved NodeB (eNB) in a wireless communication system supporting a Device to Device (D2D) scheme is provided. The eNB includes a receiver configured to receive a resource request message to request a D2D resource for a direct communication between User Equipments (UEs) from a UE. The eNB also includes a controller configured to start a first inactivity timer to control the UE to transition into an RRC idle state after setting up an RRC connection with the UE. The controller is also configured to allocate the D2D resource to the UE when the resource request message is received. The controller is further configured to release the RRC connection based on a predetermined option when a resource response message including information related to the allocated D2D resource to the UE is transmitted. The eNB further includes a transmitter configured to transmit the resource response message to the UE.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it is advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device is implemented in hardware, firmware or software, or some combination of at least two of the same. It should be noted that the functionality associated with any particular controller is centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
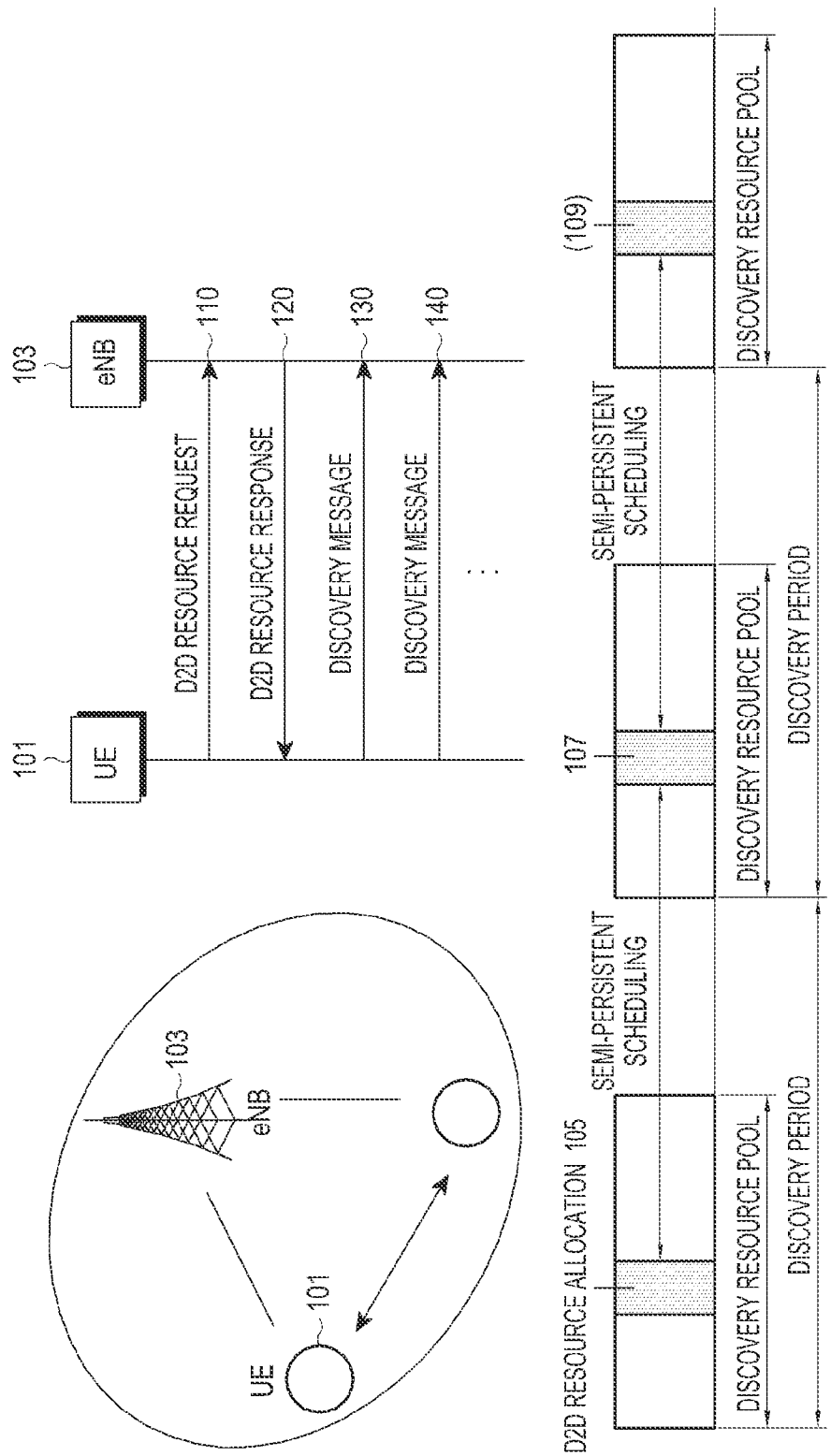
FIG. 1 schematically illustrates an example method of transmitting a discovery signal for discovering neighbor UEs in a UE and a method of allocating a resource to transmit a discovery signal in a wireless communication system supporting a D2D scheme according to this disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device and communication system.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

A discovery operation in a conventional wireless communication system supporting a D2D scheme will be described herein. An example of an operation of transmitting a discovery signal for discovering neighbor UEs in a UE and an operation of allocating a resource for transmitting a discovery signal in a wireless communication system supporting a D2D scheme will be described with reference to FIG. 1.

FIG. 1 schematically illustrates an example of an operation of transmitting a discovery signal for discovering neighbor UEs in a UE and an operation of allocating a resource for transmitting a discovery signal in a wireless communication system supporting a D2D scheme according to this disclosure. Referring to FIG. 1, the wireless communication system supporting the D2D scheme includes a UE 101 and an eNB 103. In FIG. 1, it will be assumed that UEs located in a communication area of the eNB 103 set up a D2D interface for mutually performing a D2D communication, and the UEs is co-located in the communication area of the eNB 103 or is individually located in communication areas of different eNBs. Further, it will be assumed that at least one of the UEs, such as the UE 101 accesses a D2D communication system through the eNB 103, and a resource necessary for the D2D communication is allocated to the eNB 103.

The UE 101 discovers at least one UE of which an interest field is the same or similar to the UE 101 based on discovery messages which are received from the neighbor UEs. The UE 101 broadcasts identification information of the UE 101, such as an Identity (ID) of the UE 101 thereby the neighbor UEs discover the UE 101. The discovery operation can be performed in two methods, and the two methods include a method of periodically broadcasting a discovery message to arbitrary UEs and a method of broadcasting a discovery message to a specific UE and receiving a response message to the discovery message.

Hereinafter, a discovery operation of periodically broadcasting a discovery message to arbitrary UEs will be referred to as a discovery operation mode A, and a discovery operation of broadcasting a discovery message to a specific UE and receiving a response message to the discovery message will be referred to as a discovery operation mode B. For a discovery operation, the UE 101 allocates a resource (or a D2D resource) for a discovery message transmission from the eNB 103. For this, the UE 101 which wants to transmit a discovery message transmits a D2D resource request message to the eNB 130 to request a resource for a discovery message transmission at operation 110. In FIG. 1, the D2D resource request message is used for requesting the resource for the discovery message transmission, however, it will be understood by those of ordinary skill in the art that the D2D resource request message is used for requesting a resource for data transmission.

The eNB 103 can use two methods according to a mode which the eNB 103 support to allocate a resource to the UE 101. In a first method, the eNB 103 transmits a D2D resource response message to the UE 101 to allocate available dedicated resources 105, 107, and 109 among resources included in a common resource pool which is allocated by a predetermined discovery period to the UE 101 at operation 120. The common resource pool includes resources which are allocated for a discovery operation, and the resources included in the common resource pool are used by all UEs or at least one UE which belongs to a preset group. The dedicated resources 105, 107, and 109 which are allocated to the UE 101 are semi-persistently maintained. The UE 101 broadcasts a discovery message by a predetermined discovery period using the allocated dedicated resources 105, 107, and 109 at operations 130 and 140.

As described herein, the UE 101 transmits and receives a discovery signal using the dedicated resources 105, 107, and 109 included in the common resource pool which is allocated by a predetermined discovery period so the discovery operation has periodicity. The eNB 103 transmits the D2D resource response message including information indicating a location of an allocated resource, such as the dedicated resources 105, 107, and 109. The D2D resource response message is transmitted through a System Information Block (SIB) or a Physical Downlink Control Channel (PDCCH).

In a second method, the eNB 103 transmit a D2D resource response message to the UE 101 to inform the UE 101 of a location of a common resource pool which is allocated by a predetermined discovery period. In this case, the UE 101 selects a resource to be used for a discovery message transmission from the allocated common resource pool in a contention-based method, and periodically broadcasts the discovery message using the selected resource. As described above, the UE transmits/receives a discovery signal using the resource selected from the common resource pool which is allocated by a predetermined discovery period, so the discovery operation has periodicity.

As described herein, the UE 101 transmits and receives a discovery signal using the dedicated resources 105, 107, and 109 included in the common resource pool which are allocated by a predetermined discovery period so the discovery operation has periodicity. The eNB 103 transmits the D2D resource response message including information indicating a location of the common resource pool, and the D2D resource response message is transmitted through an SIB or a PDCCH.

An example of an operation of transmitting a discovery signal for discovering neighbor UEs in a UE and an operation of allocating a resource for transmitting a discovery signal in a wireless communication system supporting a D2D scheme has been described with reference to FIG. 1, and an example of an operation of allocating a D2D resource to a UE and releasing an allocated D2D resource in a wireless communication system supporting a D2D scheme will be described with reference to FIG. 2.

Figure 2:
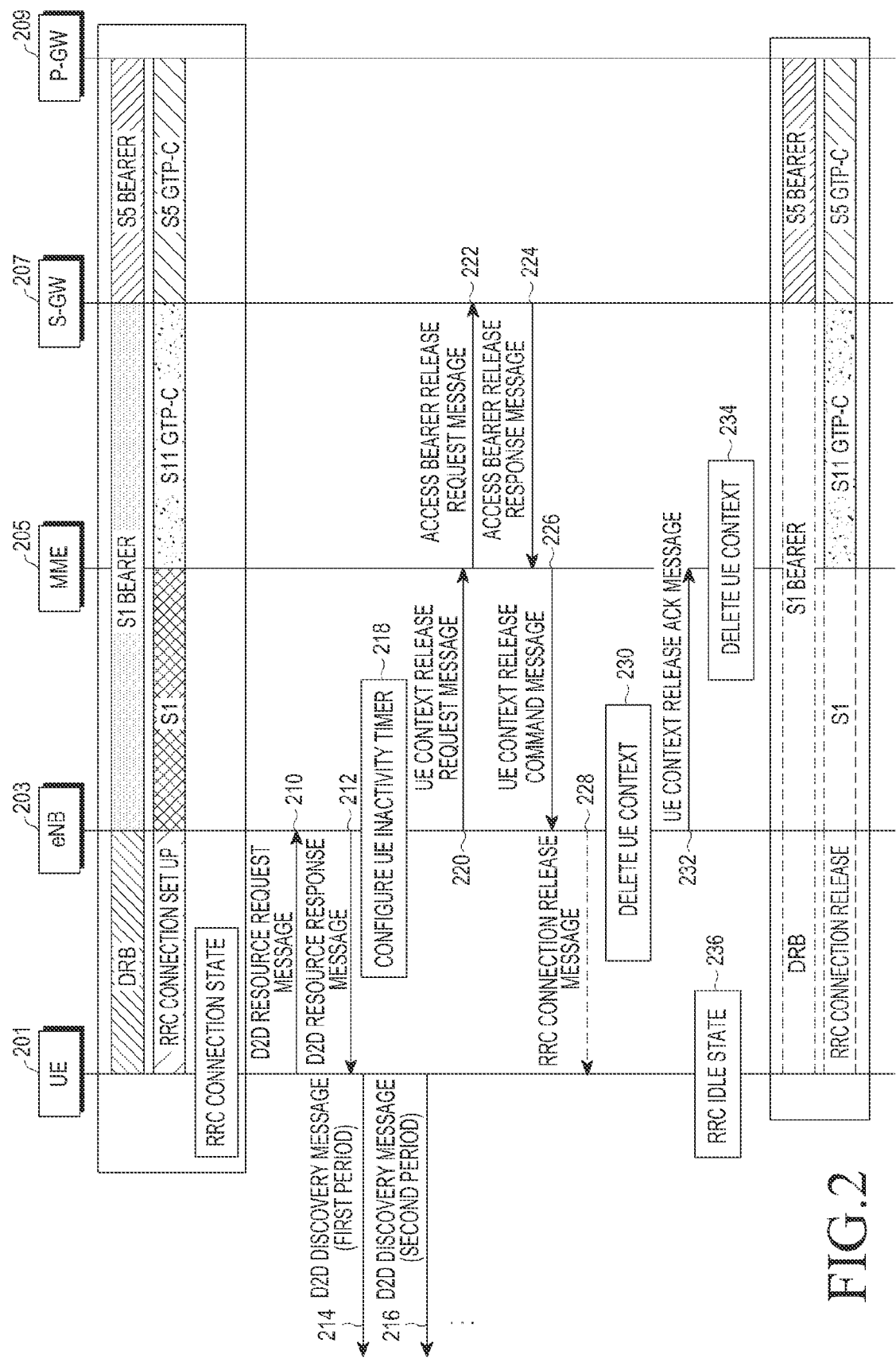
FIG. 2 schematically illustrates an example method of allocating a D2D resource to a UE and releasing an allocated D2D resource in a wireless communication system supporting a D2D scheme according to this disclosure.

FIG. 2 schematically illustrates an example of an operation of allocating a D2D resource to a UE and releasing an allocated D2D resource in a wireless communication system supporting a D2D scheme. Referring to FIG. 2, the wireless communication system includes a UE 201, an eNB 203, a Mobile Management Entity (MME) 205, a Serving Gateway (S-GW) 207, and a Packet Data Network (PDN) Gateway (P-GW) 209. A Data Radio bearer (DRB) for a default Evolved Packet System (EPS) is established between the UE 201 and the eNB 203, and an RRC connection is set up between the UE 201 and the eNB 203. After setting up the RRC connection, the UE 201 transits into an RRC connection state. It will be assumed that an S1 bearer is established between the eNB 203 and the S-GW 207, the eNB 203 is connected to the MME 205 using an S1 interface, and the MME 205 is connected to the S-GW 207 using a General Packet Radio Service (GPRS) Tunneling Protocol (GTP)-C interface. It will be assumed that an S5 bearer is established between the S-GW 207 and the P-GW 209, and the S-GW 207 is connected to the P-GW 209 using an S5 GTP-C interface.

After transiting into the RRC connection state, the UE 201 requests a resource for a discovery message transmission by transmitting a D2D resource request message at operation 210, and the eNB 203 allocates the resource for the discovery message transmission and transmits a D2D resource response message including information related to the allocated resource to the UE 201 at operation 212. The UE 201 transmits a discovery message using the allocated resource by a preset period, such as the first period or the second period, and the like at operations 214 and 216. The eNB 203 configures a UE inactivity timer and starts the configured UE inactivity timer at operation 218. The UE inactivity timer denotes a timer which is configured per UE for the eNB 203 to control the UE 201 in an RRC connection state to transit into an RRC idle state. For example, a timer value of the UE inactivity timer is set to one value from 10 to 60 seconds. The eNB 203 reconfigures the UE inactivity timer to start the reconfigured UE inactivity timer if there is Uplink (UL) traffic, such as data or a control signal which is transmitted from the UE 201 or there is Downlink (DL) traffic, such as data or a control signal which will be transmitted to the UE 201 while running the UE inactivity timer.

Upon detecting that the UE inactivity timer which has been started at operation 218 expires since there is no UL traffic which is transmitted from the UE 201 or DL traffic which will be transmitted to the UE 201, the eNB 203 transmits a UE context release request message to the MME 205 at operation 220. The MME 205 transmits an access bearer release request message to the S-GW 207 at operation 222. After receiving the access bearer release request message from the MME 205, the S-GW 207 transmits an access bearer release response message to the MME 205 in response to the access bearer release request message at operation 224.

After receiving the access bearer release response message from the S-GW 207, the MME 205 transmits a UE context release command message to the eNB 203 at operation 226. After receiving the UE context release command message from the MME 205, the eNB 203 transmits an RRC connection release message for commanding to release an RRC connection to the UE 201 at operation 228. After receiving the RRC connection release message, the UE 201 transitions from an RRC connection state to an RRC idle state at operation 236. The eNB 203 deletes a UE context at operation 230, and transmits a UE context release ACKnowledgement (ACK) message to the MME 205 in response to the UE context release command message at operation 232. After receiving the UE context release ACK message from the eNB 203, the MME 205 deletes a UE context at operation 234.

Then, the DRB and the RRC connection for the default EPS which are set up between the UE 201 and the eNB 203 are released. The connection between the eNB 203 and the MME 205 which is set up using the Si bearer which is established between the eNB 203 and the S-GW 207 and the Si interface is released. That is, only the connection between the MME and the S-GW 207 which is set up using the S5 bearer which is established between the S-GW 207 and the P-GW 209 and the S5 GTP-C interface and the connection between the S-GW 207 and the P-GW 209 which is set up using the S5 GTP-C interface are maintained.

Figure 3:
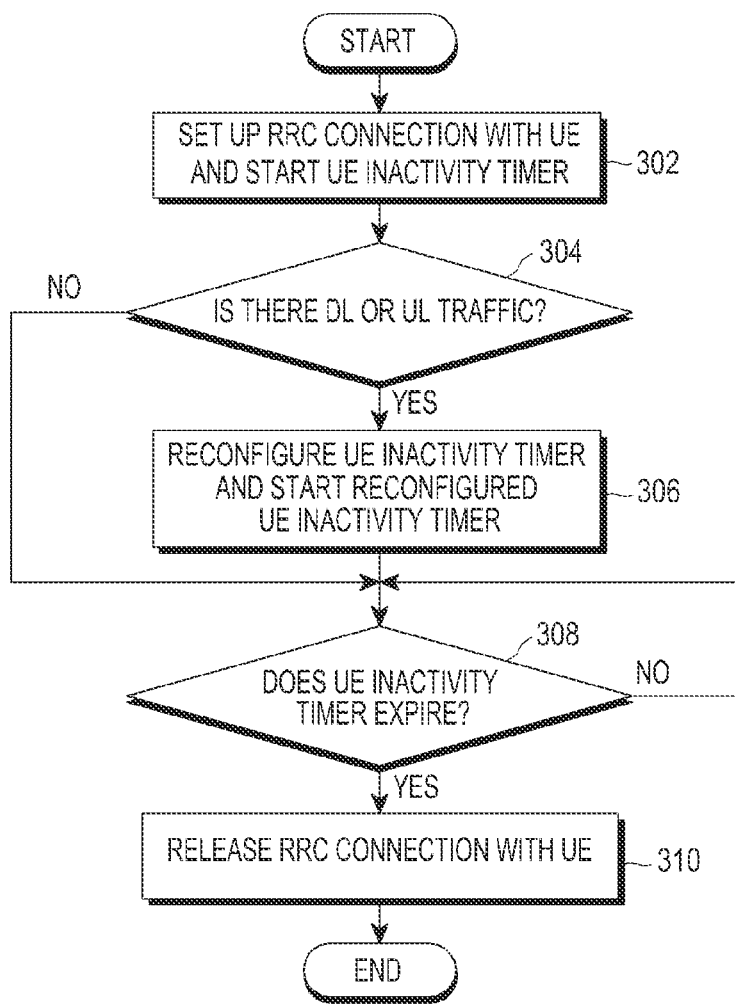
FIG. 3 schematically illustrates an example method of running a UE inactivity timer for a UE in an eNB in a wireless communication system supporting a D2D scheme according to this disclosure.

An example of an operation of allocating a D2D resource to a UE and releasing an allocated D2D resource in a wireless communication system supporting a D2D scheme has been described with reference to FIG. 2, and an example of an operation of running a UE inactivity timer for a UE in an eNB in a wireless communication system supporting a D2D scheme will be described with reference to FIG. 3. FIG. 3 schematically illustrates an example of an operation of running a UE inactivity timer for a UE in an eNB in a wireless communication system supporting a D2D scheme.

Referring to FIG. 3, an eNB sets up an RRC connection with a UE, configures a UE inactivity timer for the UE, and starts the UE inactivity timer at operation 302. The eNB determines whether there is DL traffic, such as data or a control signal or UL traffic, such as data or a control signal at operation 304. If there is the DL traffic or the UL traffic, the eNB proceeds to operation 306. If there are no DL traffic and UL traffic, the eNB determines whether the UE inactivity timer which has been started at operation 302 expires at operation 308.

The eNB reconfigures the UE inactivity timer and starts the reconfigured UE inactivity timer at operation 306. The eNB determines whether the UE inactivity timer which has been started at operation 306 expires at operation 308. If the UE inactivity timer expires, the eNB proceeds to operation 310. If the UE inactivity timer does not expire, the eNB repeats operation 308. The eNB releases the RRC connection with the UE at operation 310.

As described herein, a discovery operation mode A has repeatability and persistence, so it is effective to allocate a resource for which allocation is maintained during long time in the discovery operation mode A. However, since a UE broadcasts a discovery message through only a resource which is allocated for a discovery message transmission, an eNB which does not monitor the resource through which the discovery message is broadcasted not recognize the discovery message as UL traffic. At this time, if there is no DL traffic for the UE, a UE inactivity timer for the UE which the eNB manages is continuously run. If the UE inactivity timer expires, the eNB mistakes that the UE is currently inactive, releases an RRC connection which is set up with the UE, and controls the UE to transit into an RRC idle state.

However, a resource which is allocate from an eNB while a UE performs a discovery operation is semi-persistently allocated and is available, for example only in an RRC connection state, so if the UE transits into an RRC idle state, contradiction for an availability of the resource which is semi-persistently allocated occurs. So, in some wireless communication system supporting a D2D scheme, a UE which performs a discovery operation periodically transitions into an RRC idle state. Due to this, the UE performs a process of setting up an RRC connection with an eNB and requests a resource for a discovery message transmission all the time.

An electronic device includes communication functionality. For example, an electronic device is a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (such as a head-mounted device (HMD), electronic clothes, electronic braces, an electronic necklace, an electronic appcessory, an electronic tattoo, or a smart watch), or the like.

An electronic device is a smart home appliance with communication functionality. A smart home appliance is, for example, a television, a digital video disk (DVD) player, an audio, a refrigerator, an air conditioner, a vacuum cleaner, an oven, a microwave oven, a washer, a dryer, an air purifier, a set-top box, a TV box (such as SAMSUNG HOMESYNC™, APPLETV™, or GOOGLETV™), a gaming console, an electronic dictionary, an electronic key, a camcorder, an electronic picture frame, or the like.

An electronic device is a medical device (such as magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (such as naval navigation device, gyroscope, or compass), an avionic electronic device, a security device, an industrial or consumer robot, or the like.

An electronic device is furniture, part of a building/structure, an electronic board, electronic signature receiving device, a projector, various measuring devices (such as water, electricity, gas or electro-magnetic wave measuring devices), or the like that include communication functionality. An electronic device is any combination of the foregoing devices. In addition, it will be apparent to one having ordinary skill in the art that an electronic device according to various embodiments of the present disclosure is not limited to the foregoing devices. User Equipment (UE) is an electronic device. An apparatus and method for managing a Radio Resource Control (RRC) connection in a wireless communication system supporting a Device to Device (D2D) scheme.

An apparatus and method for managing an inactivity timer related to an RRC idle state of a UE in an evolved NodeB (eNB) in a wireless communication system supporting a D2D scheme. An apparatus and method for preventing frequent RRC state changes which occur in a case that a UE performs a discovery operation in a wireless communication system supporting a D2D scheme. An apparatus and method for preventing frequent RRC state changes which occur in a case that a UE performs a discovery operation thereby effectively managing an RRC connection between an eNB and a UE in a wireless communication system supporting a D2D scheme.

A method and apparatus proposed in various embodiments of the present disclosure are applied to various mobile communication systems such as a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a 3rd generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an evolved packet system (EPS), a mobile internet protocol (Mobile IP) system, or the like.

Figure 4:
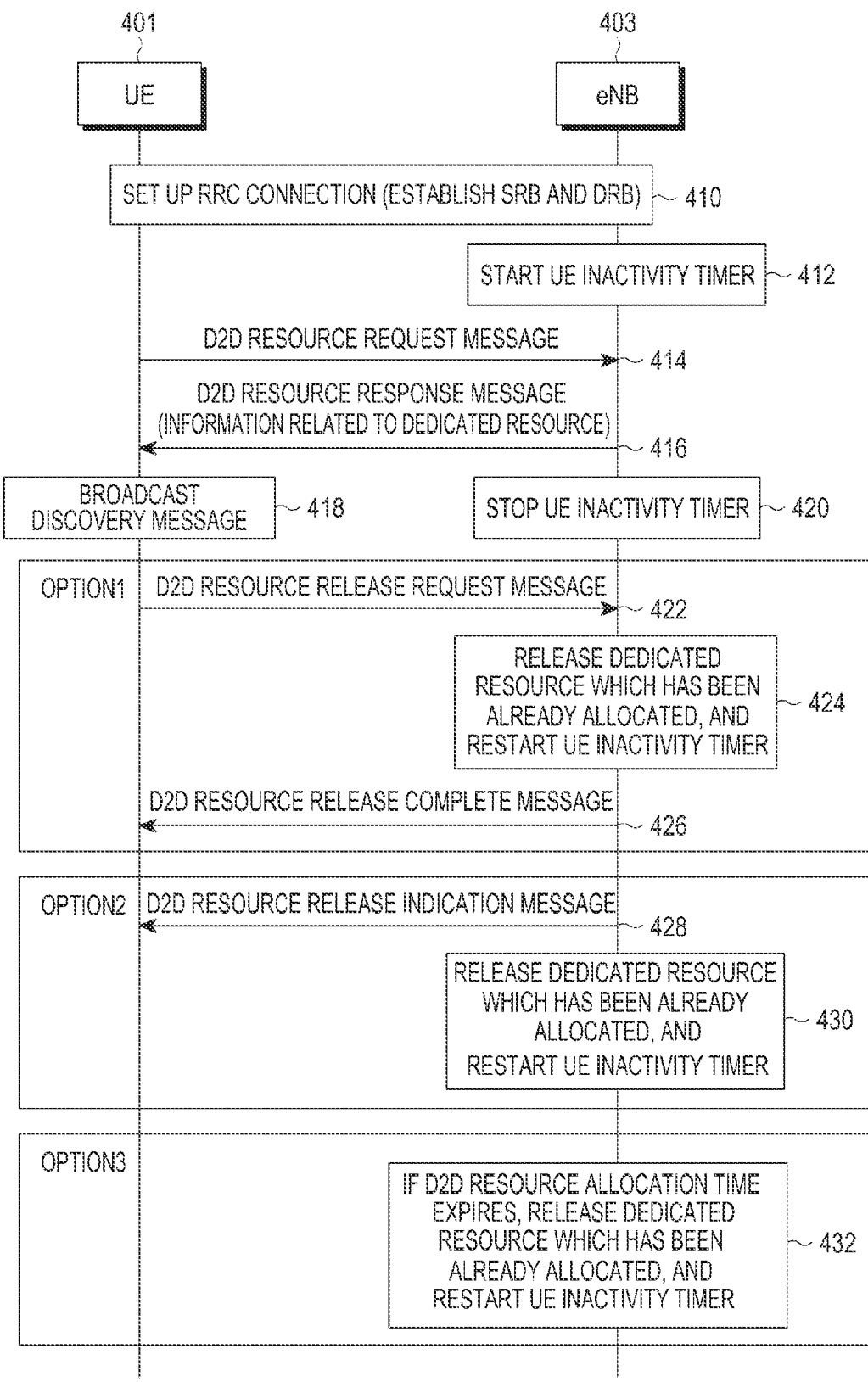
FIG. 4 schematically illustrates an example method of allocating a dedicated resource included in a common resource pool to a UE and releasing the allocated dedicated resource in a wireless communication system supporting a D2D scheme according to this disclosure.

An example of an operation of allocating a dedicated resource included in a common resource pool to a UE, and releasing the allocated dedicated resource in a wireless communication system supporting a D2D scheme according to an embodiment of the present disclosure will be described with reference to FIG. 4. FIG. 4 schematically illustrates an example method of allocating a dedicated resource included in a common resource pool to a UE, and releasing the allocated dedicated resource in a wireless communication system supporting a D2D scheme according to this disclosure. Referring to FIG. 4, the wireless communication system supporting the D2D scheme includes a UE 401 and an eNB 403, and it will be assumed that an RRC connection is set up between the UE 401 and the eNB 403, and a Signaling Radio Bearer (SRB) and a Data Radio bearer (DRB) for a default EPS bearer are established between the UE 401 and the eNB 403 at operation 410.

After setting up the RRC connection with the UE 401, the eNB 403 starts a UE inactivity timer for controlling the UE 401 to transit into an RRC idle state at operation 412. The UE 401 transmits a D2D resource request message to the eNB 403 to request a resource (or a D2D resource) for a discovery message transmission at operation 414, and the eNB 403 semi-persistently allocates a related resource to the UE 401 and transmits a D2D resource response message including information related to the related resource to the UE 401 at operation 416. For example, the information related to the related resource is information related to a location of a dedicated resource which is allocated for the discovery message transmission from a common resource pool. In this case, the information related to the location of the dedicated resource includes an index for the dedicated resource, information related to a size of the dedicated resource, information related to time during allocation of the dedicated resource is maintained, and the like. In an embodiment of the present disclosure, the eNB 403 transmits the D2D resource response message including the information related to the location of the dedicated resource, however, it will be understood by those of ordinary skill in the art that the eNB 403 transmits the D2D resource response message including information related to a location of a common resource pool in which the dedicated resource is included. An example of transmitting the D2D resource response message including the information related to the location of the common resource pool in the eNB 403 will be described with reference to FIGS. 10 to 15B, so a detailed description will be omitted herein.

The index of the dedicated resource and the information related to the size of the dedicated resource are dynamically determined based on a size which is fixed per system or a buffer size of the UE 401 and information related to the time during the allocation of the dedicated resource is maintained are determined according to an application included in the D2D resource request message transmitted from the UE 401. The D2D resource response message is transmitted through an RRC message or a Physical Downlink Control Channel (PDCCH).

The UE 401 periodically broadcasts a discovery message to neighbor UEs using the D2D resource which is allocated by the eNB 403, such as the dedicated resource at operation 418. The eNB 403 stops the UE inactivity timer for the UE 401 while transmitting the D2D resource response message at operation 420. The eNB 403 continues to stop the UE inactivity timer even though there is UpLink (UL)/DownLink (DL) traffic for the UE 401. The eNB 403 restarts the UE inactivity timer which has been stopped at operation 420 according to one of predetermined options. The predetermined options are classified into an option1 that the UE 401 initiates a D2D resource releasing operation, an option2 that the eNB 403 initiates a D2D resource releasing operation, and an option3 that a D2D resource releasing operation is performed regardless of a subject that initiates the D2D resource releasing operation, according to the subject that initiates the D2D resource releasing operation. An operation according to each option will be described below.

Firstly, the option1 is for a method of initiating the D2D resource releasing operation in the UE 401. In a case that the option1 is applied, upon receiving a D2D resource release request message from the UE 401 at operation 422, the eNB 403 releases a dedicated resource which has been already allocated, and restarts the UE inactivity timer if there is no other D2D resource allocation to the UE 401 at operation 424. The D2D resource release request message is transmitted in a case that predetermined time, such as time indicated by information related to time during the allocation for the dedicated resource is maintained expires if a D2D resource is allocated to the UE 401, or a discovery operation of the UE 401 is stopped due to detection of a discovery operation stop command. The eNB 403 transmits a D2D resource release complete message indicating that the dedicated resource which has been already allocated is released to the UE 401 at operation 426. For example, the D2D resource release complete message is transmitted through an RRC message or a PDCCH.

Secondly, the option2 is for a method of initiating the D2D resource releasing operation in the eNB 403. In a case that the option2 is applied, the eNB 403 transmits a D2D resource release indication message indicating that the eNB 403 will release the dedicated resource which has been already allocated to the UE 401 if one of a case that overload occurs in a network, a case that the eNB 403 is unable to maintain the allocation of the D2D resource, a case that the UE 401 performs a handover, and a case that time during which the allocation of the D2D resource is maintained expires occurs at operation 428. The eNB 403 releases the dedicated resource which has been already allocated to the UE 401, and restarts the UE inactivity timer if there is no other D2D resource allocation to the UE 401 at operation 430. If other D2D resource is allocated to the UE 401, the eNB 403 continues to stop the UE inactivity timer at operation 430.

Thirdly, the option3 is for a method of operating regardless of the subject that initiates the D2D resource releasing operation. In a case that the option3 is applied, if time during allocation of a D2D resource which the eNB 403 has already known is maintained, such as D2D resource allocation time expires, the eNB 403 releases the D2D resource which has been already allocated to the UE 401, detects that all D2D resources are released, and restarts the UE inactivity timer at operation 432.

Although FIG. 4 illustrates an example method of allocating a dedicated resource included in a common resource pool to a UE, and releasing the allocated dedicated resource in a wireless communication system supporting a D2D scheme according to this disclosure, various changes could be made to FIG. 4. For example, although shown as a series of operations, various operations in FIG. 4 could overlap, occur in parallel, occur in a different order, or occur multiple times.

An example method of allocating a dedicated resource included in a common resource pool to a UE, and releasing the allocated dedicated resource in a wireless communication system supporting a D2D scheme according to an embodiment of the present disclosure has been described with reference to FIG. 4, and an example of an operation of managing an RRC connection for a UE in an eNB in a wireless communication system supporting a D2D scheme according to an embodiment of the present disclosure will be described with reference to FIGS. 5A and 5B.

Figure 5A:
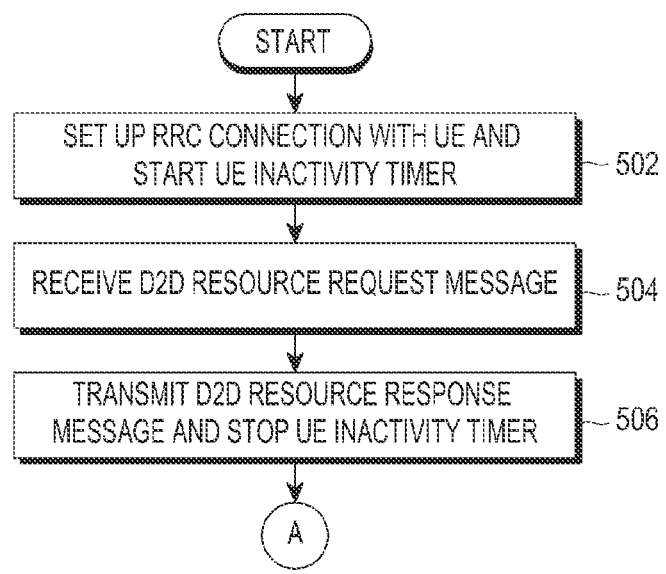
FIGS. 5A and 5B schematically illustrate an example method of managing an RRC connection for a UE in an eNB in a wireless communication system supporting a D2D scheme according to this disclosure.
Figure 5B:
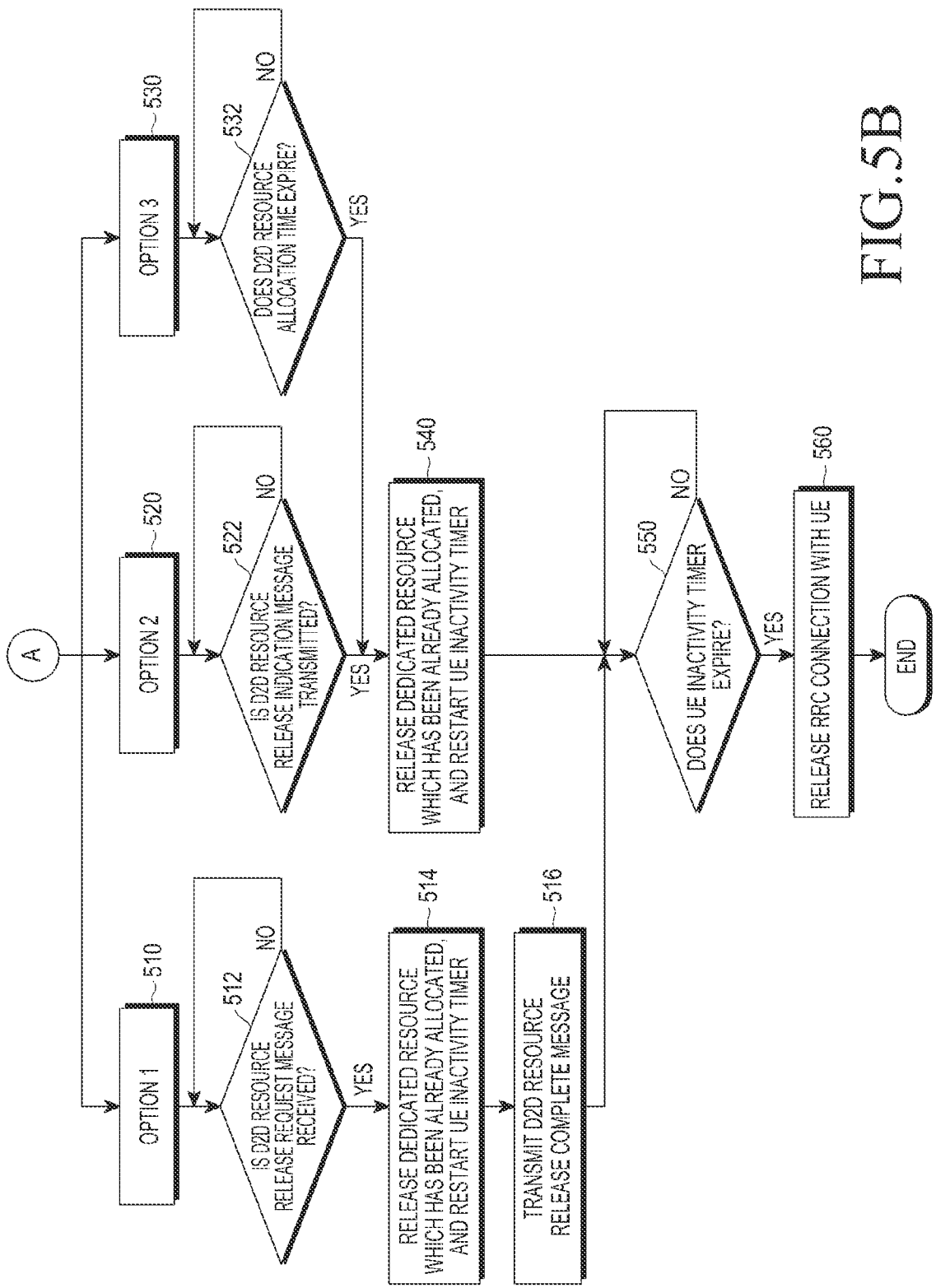

FIGS. 5A and 5B schematically illustrate an example method of managing an RRC connection for a UE in an eNB in a wireless communication system supporting a D2D scheme according to this disclosure. Referring to FIGS. 5A and 5B, an eNB sets up an RRC connection with a UE, configures a UE inactivity timer for the UE, and starts the UE inactivity timer at operation 502. FIGS. 5A and 5B, the eNB reconfigures the UE inactivity timer to start the reconfigured UE inactivity timer if there is UL/DL traffic for the UE while running the UE inactivity timer.

The eNB receives a D2D resource request message for requesting a D2D resource from the UE at operation 504. The eNB allocates the D2D resource to the UE, and stops the UE inactivity timer which is running by transmitting a D2D resource response message including information related to the D2D resource at operation 506. For example, the information related to the D2D resource is information related to a location of a dedicated resource which is allocated for a discovery message transmission from a common resource pool for a D2D communication. In this case, the information related to the location of the dedicated resource includes at least one of an index for the dedicated resource, information related to a size of the dedicated resource, and information related to time during which allocation of the dedicated resource is maintained. At this time, the UE maintains an RRC connection state with the eNB even though there is no UL/DL traffic for the eNB.

The eNB proceeds to one of operations 510, 520, and 530. It will be noted that the operations 510, 520, and 530 are operations for distinguishing operations of the options 1, 2, and 3. After proceeding to operation 510 of the option1, the eNB determines whether a D2D resource release request message for requesting a release of a D2D resource which has been already allocated is received from the UE at operation 512. If the D2D resource release request message is not received from the UE, the eNB repeats operation 512.

If the D2D resource release request message is received from the UE, the eNB releases the D2D resource which has been already allocated, and restarts the UE inactivity timer which has been stopped at operation 506 at operation 514. The eNB transmits a D2D resource release complete message indicating that the D2D resource which has been already allocated is released to the UE at operation 516. The eNB determines whether the UE inactivity timer expires at operation 550. At this time, the eNB repeats operation 550 until the UE inactivity timer expires. If the UE inactivity timer expires, the eNB releases the RRC connection which has been set up with the UE at operation 502 at operation 560.

FIGS. 5A and 5B, the eNB reconfigure the UE inactivity timer to start the reconfigured UE inactivity timer if there is UL/DL traffic for the UE while running the UE inactivity timer. After proceeding to operation 520 of the option2, the eNB determines whether a D2D resource release indication message indicating that the eNB will release a D2D resource which has been already allocated is transmitted to the UE at operation 522. If the D2D resource release indication message is not transmitted to the UE, the eNB repeats operation 522. If the D2D resource release indication message is transmitted to the UE, the eNB releases the D2D resource which has been already allocated, and restarts the UE inactivity timer which has been stopped at operation 506 at operation 540. Then, the eNB performs operations 550 and 560. Here, operations 550 and 560 have been described in the option1, so a detailed description will be omitted herein.

After proceeding to operation 530 of the option3, the eNB determines whether time during which the allocation of the D2D resource which has been already allocated is maintained, such as D2D resource allocation time expires at operation 532. If the D2D resource allocation time does not expire, the eNB repeats operation 532. If the D2D resource allocation time expires, the eNB releases the D2D resource which has been already allocated, and restarts the UE inactivity timer which has been stopped at operation 506 at operation 540. Then, the eNB performs operations 550 and 560. Here, operations 550 and 560 have been described in the option1, so a detailed description will be omitted herein. Although FIGS. 5A and 5B illustrate an example method of managing an RRC connection for a UE in an eNB in a wireless communication system supporting a D2D scheme according to this disclosure, various changes could be made to FIGS. 5A and 5B. For example, although shown as a series of operations, various operations in FIGS. 5A and 5B could overlap, occur in parallel, occur in a different order, or occur multiple times.

An example method of managing an RRC connection for a UE in an eNB in a wireless communication system supporting a D2D scheme according to this disclosure has been described with reference to FIGS. 5A and 5B, and another example of an operation of allocating a dedicated resource included in a common resource pool to a UE, and releasing the allocated dedicated resource in a wireless communication system supporting a D2D scheme according to this disclosure will be described with reference to FIG. 6.

Figure 6:
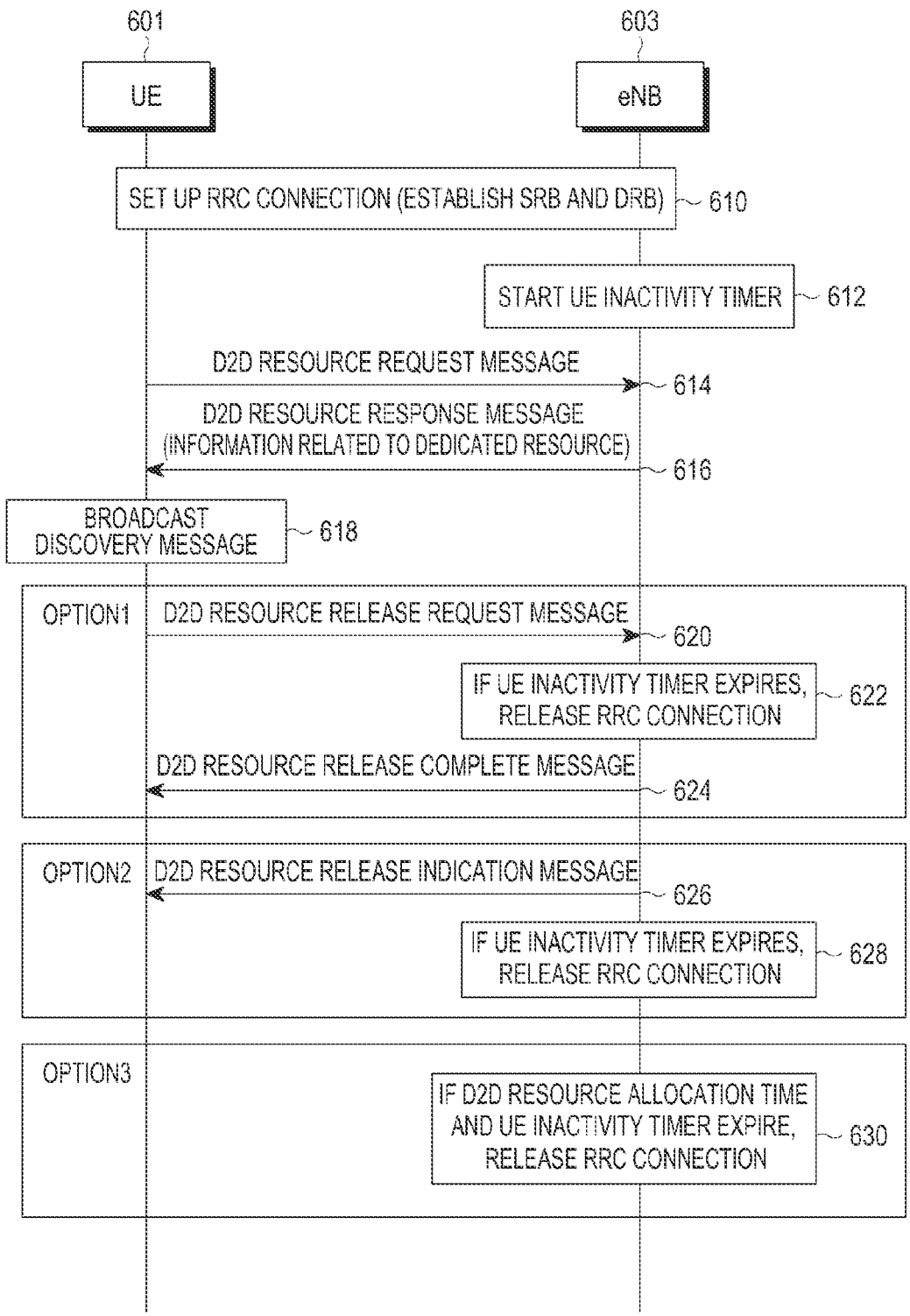
FIG. 6 schematically illustrates an example method of allocating a dedicated resource included in a common resource pool to a UE and releasing the allocated dedicated resource in a wireless communication system supporting a D2D scheme according to this disclosure.

FIG. 6 schematically illustrates an example method of allocating a dedicated resource included in a common resource pool to a UE and releasing the allocated dedicated resource in a wireless communication system supporting a D2D scheme according to this disclosure. Referring to FIG. 6, the wireless communication system supporting the D2D scheme includes a UE 601 and an eNB 603, and it will be assumed that an RRC connection is set up between the UE 601 and the eNB 603, and an SRB and a DRB for a default EPS bearer are established between the UE 601 and the eNB 603 at operation 610.

After setting up the RRC connection with the UE 601, the eNB 603 starts a UE inactivity timer for controlling the UE 601 to transit into an RRC idle state at operation 612. The UE 601 transmits a D2D resource request message to the eNB 603 to request a resource (or a D2D resource) for a discovery message transmission at operation 614. After receiving the D2D resource request message from the UE 601, the eNB 603 semi-persistently allocates a related resource to the UE 601 and transmits a D2D resource response message including information related to the related resource to the UE 601 at operation 616. For example, the information related to the related resource is information related to a location of a dedicated resource which is allocated for the discovery message transmission from a common resource pool. In this case, the information related to the location of the dedicated resource includes an index for the dedicated resource, information related to a size of the dedicated resource, information related to time during allocation of the dedicated resource is maintained, and the like. Here, the eNB 603 transmits the D2D resource response message including the information related to the location of the dedicated resource, however, it will be understood by those of ordinary skill in the art that the eNB 603 transmits the D2D resource response message including information related to a location of a common resource pool in which the dedicated resource is included. An example of transmitting the D2D resource response message including the information related to the location of the common resource pool in the eNB 603 will be described with reference to FIGS. 10 to 15B, so a detailed description will be omitted herein.

The index of the dedicated resource and the information related to the size of the dedicated resource is dynamically determined based on a size which is fixed per system or a buffer size of the UE 601, and information related to the time during the allocation of the dedicated resource is maintained is determined according to an application included in the D2D resource request message transmitted from the UE 601. For example, the D2D resource response message is transmitted through an RRC message or a PDCCH. The UE 601 periodically broadcasts a discovery message to neighbor UEs using the D2D resource which is allocated by the eNB 603, such as a dedicated resource at operation 618. The eNB 603 releases an RRC connection with the UE 601 according to one of the predetermined options. The predetermined options are classified into an option1 that the UE 601 initiates a D2D resource releasing operation, an option2 that the eNB 603 initiates a D2D resource releasing operation, and an option3 that a D2D resource releasing operation is performed regardless of a subject that initiates the D2D resource releasing operation, according to the subject that initiates the D2D resource releasing operation. An operation according to each option is described herein.

Firstly, the option1 is a method of initiating the D2D resource releasing operation in the UE 601. In a case that the option1 is applied, upon a D2D resource release request message from the UE 601 at operation 620, the eNB 603 determines whether the UE inactivity timer which has been started at operation 612 expires. If the UE inactivity timer expires, the eNB 603 releases the RRC connection with the UE 601 at operation 622. The D2D resource release request message is transmitted in a case that predetermined time, such as time indicated by information related to time during the allocation for the dedicated resource is maintained expires if the UE 601 is allocated a D2D resource, or a discovery operation of the UE 601 is stopped due to detection of a discovery operation stop command.

The eNB 603 transmits a D2D resource release complete message indicating that the dedicated resource which has been already allocated is released to the UE 601 at operation 624. For example, the D2D resource release complete message is transmitted through an RRC message or a PDCCH. If the UE inactivity timer expires and a resource for other D2D communication is allocated, the eNB 603 releases a related D2D resource, such as a dedicated resource, and transmits the D2D resource release complete message to the UE 601 while maintaining the RRC connection with the UE 601. If the UE inactivity timer does not expire, the eNB 603 releases the dedicated resource which has been already allocated and continues to run the UE inactivity timer.

Secondly, the option2 is for a method of initiating the D2D resource releasing operation in the eNB 603. In a case that the option2 is applied, the eNB 603 transmits a D2D resource release indication message indicating that the eNB 603 will release the dedicated resource which has been already allocated to the UE 601 if one of a case that overload occurs in a network, a case that the eNB 603 is unable to maintain the allocation of the D2D resource, a case that the UE 601 performs a handover, and a case that time during which the allocation of the D2D resource is maintained expires occurs at operation 626. After transmitting the D2D resource release indication message, the eNB 603 determines whether a UE inactivity timer expires, and releases the RRC connection with the UE 601 if the UE inactivity timer expires and there is no D2D resource which has been allocated to the UE 601 at operation 628.

If the UE inactivity timer expires and a resource for other D2D communication has been allocated to the UE 601, the eNB 603 releases a related D2D resource, such as a dedicated resource, and transmits the D2D resource release indication message to the UE 601 while maintain the RRC connection with the UE 601. If the UE inactivity timer does not expire, the eNB 603 releases the dedicated resource which has been already allocated and continues to run the UE inactivity timer.

Thirdly, the option3 is for a method of operating regardless of the subject that initiates the D2D resource releasing operation. In a case that the option3 is applied, if a time during allocation of a D2D resource is maintained which the eNB 603 has already known, such as D2D resource allocation time expires, the eNB 603 determines whether a UE inactivity timer expires, and releases the RRC connection with the UE 601 if the UE inactivity timer expires and there is no D2D resource which has been allocated to the UE 601 at operation 630. If the UE inactivity timer does not expire and there is no D2D resource which has been allocated to the UE 601, the eNB 603 continues to run the UE inactivity timer.

Although FIG. 6 illustrates an example method of allocating a dedicated resource included in a common resource pool to a UE and releasing the allocated dedicated resource in a wireless communication system supporting a D2D scheme according to an embodiment of the present disclosure, various changes could be made to FIG. 6. For example, although shown as a series of operations, various operations in FIG. 6 could overlap, occur in parallel, occur in a different order, or occur multiple times.

Figure 7A:
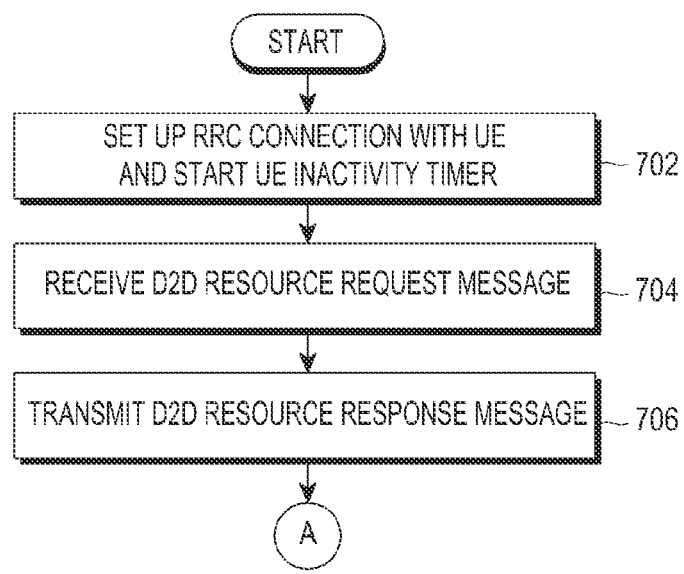
FIGS. 7A and 7B schematically illustrate an example method of managing an RRC connection for a UE in an eNB in a wireless communication system supporting a D2D scheme according to this disclosure.
Figure 7B:
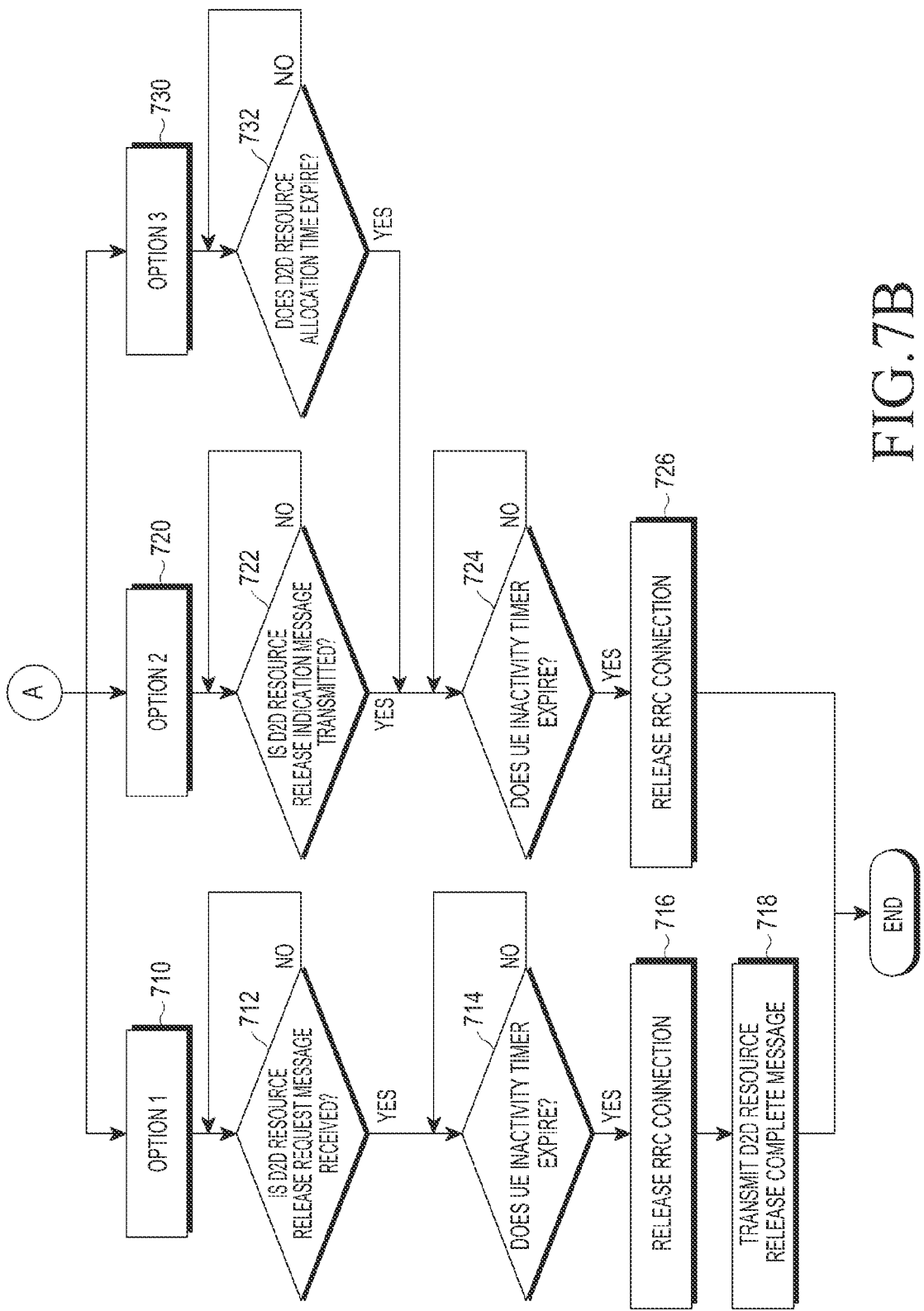

Another example method of allocating a dedicated resource included in a common resource pool to a UE, and releasing the allocated dedicated resource in a wireless communication system supporting a D2D scheme according to an embodiment of the present disclosure has been described with reference to FIG. 6, and an example method of managing an RRC connection for a UE in an eNB in a wireless communication system supporting a D2D scheme according this disclosure will be described with reference to FIGS. 7A and 7B. FIGS. 7A and 7B schematically illustrate an example method of managing an RRC connection for a UE in an eNB in a wireless communication system supporting a D2D scheme according to this disclosure.

Referring to FIGS. 7A and 7B, an eNB sets up an RRC connection with a UE, configures a UE inactivity timer for the UE, and starts the UE inactivity timer at operation 702. FIGS. 7A and 7B, the eNB reconfigures the UE inactivity timer to start the reconfigured UE inactivity timer if there is UL/DL traffic for the UE while running the UE inactivity timer. The eNB receives a D2D resource request message for requesting a D2D resource from the UE at operation 704. The eNB allocates the D2D resource to the UE, and transmits a D2D resource response message including information related to the D2D resource at operation 706. For example, the information related to the D2D resource is information related to a location of a dedicated resource which is allocated for a discovery message transmission from a common resource pool for a D2D communication. In this case, the information related to the location of the dedicated resource includes at least one of an index for the dedicated resource, information related to a size of the dedicated resource, and information related to time during which allocation of the dedicated resource is maintained. At this time, the UE maintains an RRC connection state with the eNB while the allocated D2D resource is maintained even though the UE inactivity timer which has been started at operation 702 expires. In a case that the D2D resource is allocated to the UE, the eNB reconfigures the UE inactivity timer to start the reconfigured UE inactivity timer if there is UL/DL traffic for the UE even though the UE inactivity timer expires.

The eNB proceeds to one of operations 710, 720, and 730. It will be noted that the operations 710, 720, and 730 are operations for only distinguishing operations of the options 1, 2, and 3 not operations that an actual operation is performed. After proceeding to operation 710 of the option1, the eNB determines whether a D2D resource release request message for requesting a release of a D2D resource which has been already allocated is received from the UE at operation 712. If the D2D resource release request message is not received from the UE, the eNB repeats operation 712. If the D2D resource release request message is received from the UE, the eNB determines whether the UE inactivity timer which has been started at operation 702 expires at operation 714. If the UE inactivity timer does not expire, the eNB repeats operation 714. If the UE inactivity timer expires, the eNB releases the RRC connection with the UE at operation 716. The eNB transmits a D2D resource release complete message indicating that the D2D resource which has been already allocated is released to the UE at operation 718.

FIGS. 7A and 7B, if a resource for other D2D communication is allocated even though the UE inactivity timer expires, the eNB release a related D2D resource and transmit the D2D resource release complete message to the UE while maintaining the RRC connection with the UE. After proceeding to operation 720 of the option2, the eNB determines whether a D2D resource release indication message indicating that the eNB will release a D2D resource which has been already allocated is transmitted to the UE at operation 722. If the D2D resource release indication message is not transmitted to the UE, the eNB repeats operation 722.

If the D2D resource release indication message is transmitted to the UE, the eNB determines whether the UE inactivity timer which has been started at operation 702 expires at operation 724. If the UE inactivity timer does not expire, the eNB repeats operation 724. If the UE inactivity timer expires, the eNB releases the RRC connection with the UE at operation 726.

After proceeding to operation 730 of the option3, the eNB determines whether time during which the allocation of the D2D resource which has been already allocated is maintained, such as D2D resource allocation time expires at operation 732. If the D2D resource allocation time does not expire, the eNB repeats operation 732. If the D2D resource allocation time expires, the eNB determines whether the UE inactivity timer which has been stared at operation 702 expires at operation 724. If the UE inactivity timer does not expire, the eNB repeats operation 724. If the UE inactivity timer expires, the eNB releases the RRC connection with the UE at operation 726.

Although FIGS. 7A and 7B illustrate an example method of managing an RRC connection for a UE in an eNB in a wireless communication system supporting a D2D scheme according to this disclosure, various changes could be made to FIGS. 7A and 7B. For example, although shown as a series of operations, various operations in FIGS. 7A and 7B could overlap, occur in parallel, occur in a different order, or occur multiple times.

An example method of managing an RRC connection for a UE in an eNB in a wireless communication system supporting a D2D scheme according to this disclosure has been described with reference to FIGS. 7A and 7B, and still another example method of allocating a dedicated resource included in a common resource pool to a UE and releasing the allocated dedicated resource in a wireless communication system supporting a D2D scheme according to this disclosure will be described with reference to FIG. 8.

Figure 8:
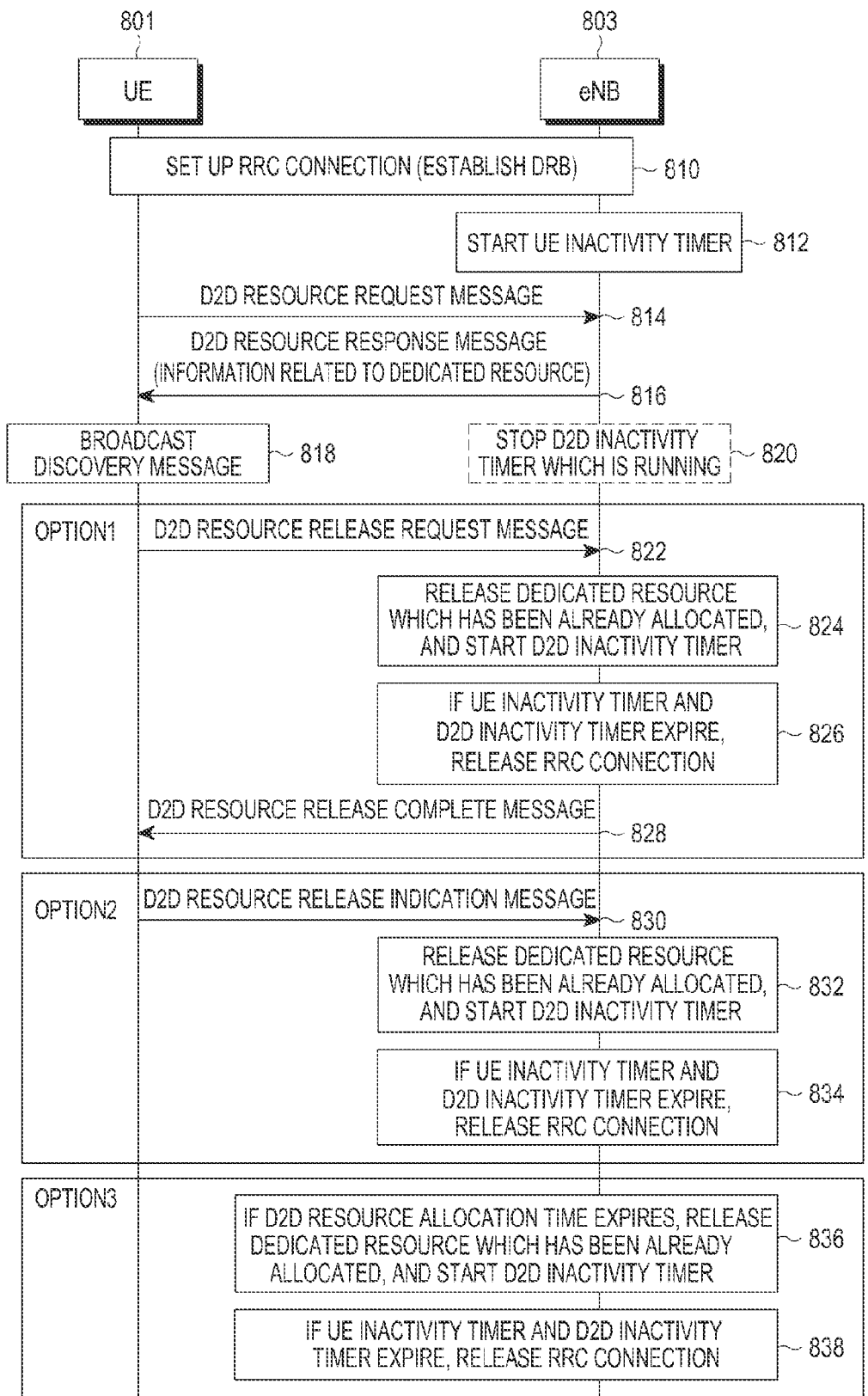
FIG. 8 schematically illustrates an example method of allocating a dedicated resource included in a common resource pool to a UE and releasing the allocated dedicated resource in a wireless communication system supporting a D2D scheme according to this disclosure.

FIG. 8 schematically illustrates an example method of allocating a dedicated resource included in a common resource pool to a UE and releasing the allocated dedicated resource in a wireless communication system supporting a D2D scheme according to an embodiment of the present disclosure. Referring to FIG. 8, the wireless communication system includes a UE 801 and an eNB 803, and it will be assumed that an RRC connection is set up between the UE 801 and the eNB 803, and a DRB for a default EPS bearer is established between the UE 801 and the eNB 803 at operation 810.

After setting up the RRC connection with the UE 801, the eNB 803 starts a UE inactivity timer for controlling the UE 801 to transit into an RRC idle state at operation 812. The UE 801 transmits a D2D resource request message to the eNB 803 to request a resource (or a D2D resource) for a discovery message transmission at operation 814. The eNB 803 semi-persistently allocates a related resource to the UE 801 and transmits a D2D resource response message including information related to the related resource to the UE 801 at operation 816. For example, the information related to the related resource is information related to a location of a dedicated resource which is allocated for the discovery message transmission from a common resource pool. In this case, the information related to the location of the dedicated resource includes an index for the dedicated resource, information related to a size of the dedicated resource, information related to time during allocation of the dedicated resource is maintained, and the like. In FIG. 8, the eNB 803 transmits the D2D resource response message including the information related to the location of the dedicated resource.

However, it will be understood by those of ordinary skill in the art that the eNB 803 transmits the D2D resource response message including information related to a location of a common resource pool in which the dedicated resource is included. An example of transmitting the D2D resource response message including the information related to the location of the common resource pool in the eNB 803 will be described with reference to FIGS. 10 to 15B, so a detailed description will be omitted herein.

The index of the dedicated resource and the information related to the size of the dedicated resource are dynamically determined based on a size which is fixed per system or a buffer size of the UE 801, and information related to the time during the allocation of the dedicated resource is maintained are determined according to an application included in the D2D resource request message transmitted from the UE 801. For example, the D2D resource response message is transmitted through an RRC message or a PDCCH.

The UE 801 periodically broadcasts a discovery message to neighbor UEs using the D2D resource which is allocated by the eNB 803, such as a dedicated resource at operation 818. The eNB 803 determines whether a D2D inactivity timer is running, and stops the D2D inactivity timer if the D2D inactivity timer is running at operation 820. Here, operation 820 is omitted if the D2D inactivity timer is not running. The D2D inactivity timer is a timer which is configured per UE for the eNB 803 to control the UE 801 in an RRC connection state to transit into an RRC idle state, and has a function similar to a UE inactivity timer. The only difference between the D2D inactivity timer and the UE inactivity timer is that the UE inactivity timer is started if the eNB 803 sets up an RRC connection with the UE 801, and the D2D inactivity timer is started if the eNB 803 releases a D2D resource which has been already allocated.

The eNB 803 releases the RRC connection with the UE 801 according to one of predetermined options. The predetermined options are classified into an option1 that the UE 801 initiates a D2D resource releasing operation, an option2 that the eNB 803 initiates a D2D resource releasing operation, and an option3 that a D2D resource releasing operation is performed regardless of a subject that initiates the D2D resource releasing operation, according to the subject that initiates the D2D resource releasing operation. An operation according to each option will be described below.

The option1 is for a method of initiating the D2D resource releasing operation in the UE 801. In a case that the option1 is applied, upon a D2D resource release request message from the UE 801 at operation 822, the eNB 403 releases a D2D resource which has been already allocated, and starts a D2D inactivity timer at operation 824. The D2D resource release request message is transmitted in a case that predetermined time, such as time indicated by information related to time during which the allocation for the dedicated resource is maintained expires if a D2D resource is allocated to the UE 801, or a discovery operation is stopped due to a discovery operation stop command, and the like.

The eNB 803 determines whether the UE inactivity timer which has been started at operation 812 and the D2D inactivity timer which has been started at operation 824 expire, and releases the RRC connection with the UE 801 if all of the UE inactivity timer and the D2D inactivity timer expire at operation 826. The eNB 803 transmits a D2D resource release complete message indicating that the dedicated resource which has been already allocated is released to the UE 801 in response to the D2D resource release request message at operation 828. For example, the D2D resource release complete message is transmitted through an RRC message or a PDCCH. If the UE inactivity timer expires and the D2D inactivity timer does not expire, the eNB 803 continues to run the D2D inactivity timer while maintaining the RRC connection with the UE 801.

The option2 is for a method of initiating the D2D resource releasing operation in the eNB 803. In a case that the option2 is applied, the eNB 403 transmits a D2D resource release indication message indicating that the eNB 403 will release the dedicated resource which has been already allocated to the UE 401 if one of a case that overload occurs in a network, a case that the eNB 403 is unable to maintain the allocation of the D2D resource, a case that the UE 801 performs a handover, and a case that time during which the allocation of the dedicated resource expires occurs at operation 830.

After transmitting the D2D resource release indication message, the eNB 803 releases a D2D resource which has been already allocated and starts a D2D inactivity timer at operation 832. The eNB 803 determines whether the UE inactivity timer which has been started at operation 812 and the D2D inactivity timer which has been started at operation 832 expire, and releases the RRC connection with the UE 801 if all of the UE inactivity timer and the D2D inactivity timer expire at operation 834. If the UE inactivity timer expires and the D2D inactivity timer does not expire, the eNB 803 continues to run the D2D inactivity timer while maintaining the RRC connection with the UE 801.

The option3 is for a method of operating regardless of the subject that initiates the D2D resource releasing operation. In a case that the option3 is applied, if time during allocation of a D2D resource is maintained which the eNB 803 has already known, such as D2D resource allocation time expires, the eNB 803 releases a dedicated resource which has been already allocated, and starts the D2D inactivity timer at operation 836. The eNB 803 determines whether the UE inactivity timer which has been started at operation 812 and the D2D inactivity timer which has been started at operation 836 expire, and release the RRC connection with the UE 801 if all of the UE inactivity timer and the D2D inactivity timer expire at operation 838. If the UE inactivity timer expires and the D2D inactivity timer does not expire, the eNB 803 continues to run the D2D inactivity timer while maintaining the RRC connection with the UE 801.

Although FIG. 8 illustrates an example method of allocating a dedicated resource included in a common resource pool to a UE and releasing the allocated dedicated resource in a wireless communication system supporting a D2D scheme according to this disclosure, various changes could be made to FIG. 8. For example, although shown as a series of operations, various operations in FIG. 8 could overlap, occur in parallel, occur in a different order, or occur multiple times.

An example method of allocating a dedicated resource included in a common resource pool to a UE and releasing the allocated dedicated resource in a wireless communication system supporting a D2D scheme according to this disclosure has been described with reference to FIG. 8, and an example method of managing an RRC connection for a UE in an eNB in a wireless communication system supporting a D2D scheme according to this disclosure will be described with reference to FIGS. 9A and 9B.

Figure 9A:
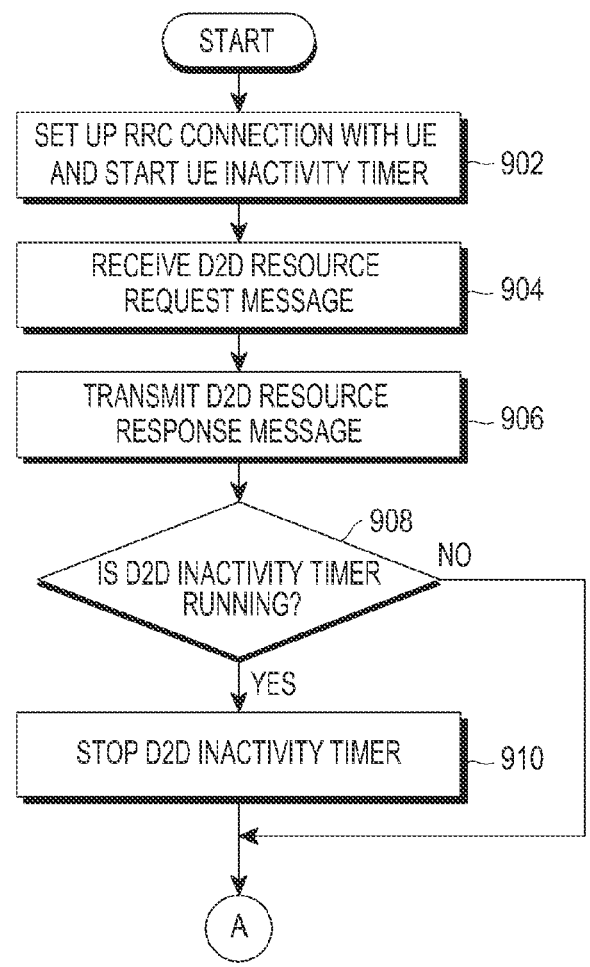
FIGS. 9A and 9B schematically illustrate an example method of managing an RRC connection for a UE in an eNB in a wireless communication system supporting a D2D scheme according to this disclosure.
Figure 9B:
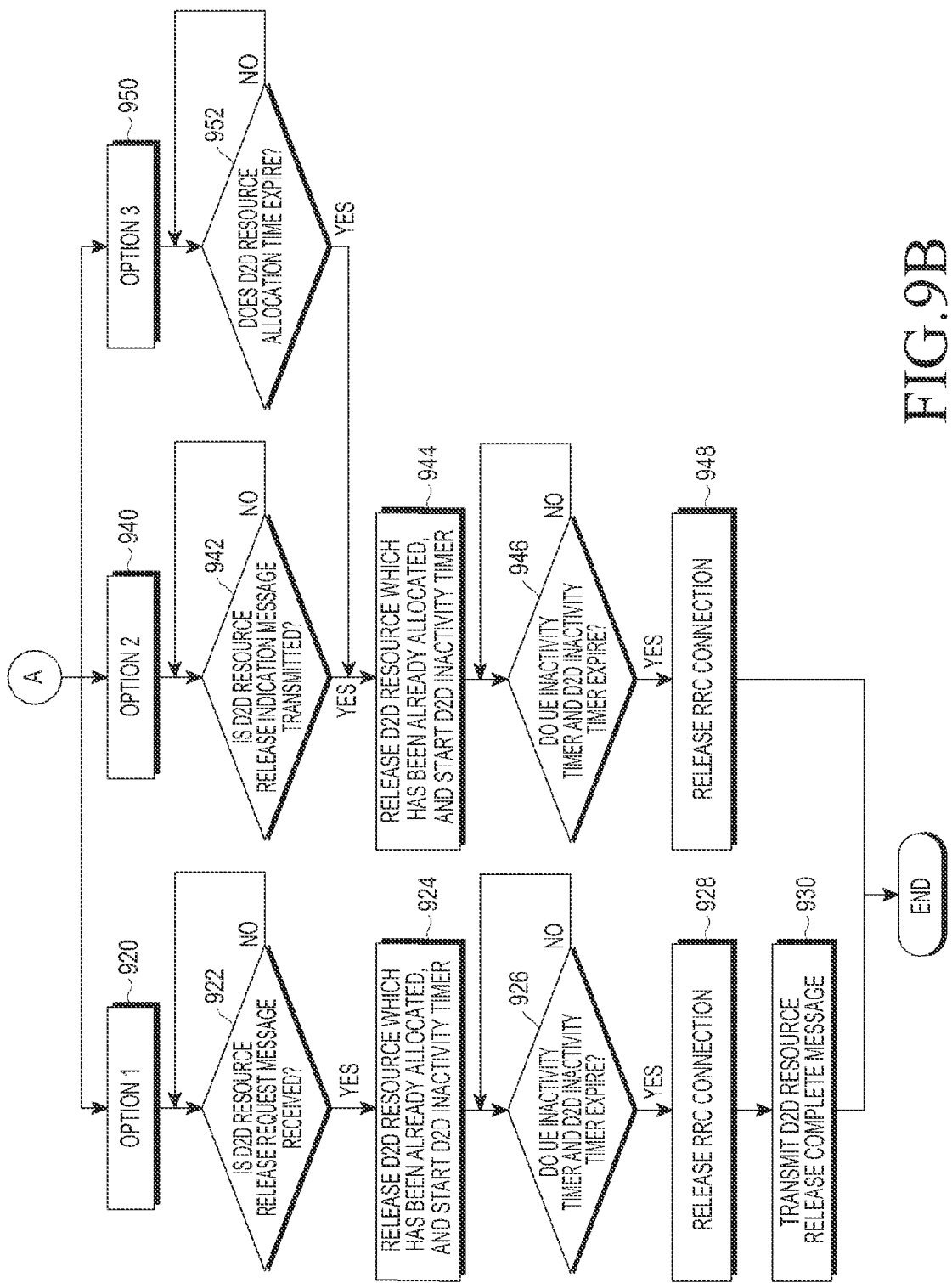

FIGS. 9A and 9B schematically illustrate an example method of managing an RRC connection for a UE in an eNB in a wireless communication system supporting a D2D scheme according to an embodiment of the present disclosure. Referring to FIGS. 9A and 9B, an eNB sets up an RRC connection with a UE, configures a UE inactivity timer for the UE, and starts the configured UE inactivity timer at operation 902. In FIGS. 9A and 9B, the eNB reconfigures the UE inactivity timer to start the reconfigured UE inactivity timer if there is UL/DL traffic for the UE while running the UE inactivity timer.

The eNB receives a D2D resource request message for requesting a D2D resource from the UE at operation 904. The eNB allocates the D2D resource to the UE and transmits a D2D resource response message including information related to the D2D resource at operation 906. Even though the UE inactivity timer which has been started at operation 902 expires, the UE maintains an RRC connection state with the eNB while the allocated D2D resource is maintained. On a state that a D2D resource is allocated, even though the UE inactivity timer expires, the eNB reconfigures the UE inactivity timer if there is UL/DL traffic for the UE, and starts the reconfigured UE inactivity timer.

The eNB determines whether a D2D inactivity timer is running at operation 908. If the D2D inactivity timer is running, the eNB stops the D2D inactivity timer at operation 910. The eNB proceeds to one of operations 920, 940, and 950. Even though the D2D inactivity timer is not running, the eNB proceeds to one of operations 920, 940, and 950. It will be noted that the operations 920, 940, and 950 are operations for distinguishing operations of the options 1, 2, and 3.

After proceeding to operation 920 of the option1, the eNB determines whether a D2D resource release request message for requesting release of a D2D resource which has been already allocated is received from the UE at operation 922. If the D2D resource release request message is not received from the UE, the eNB repeats operation 922. If the D2D resource release request message is received from the UE, the eNB releases the D2D resource which has been already allocated, and starts a D2D inactivity timer at operation 924. The eNB determines whether the UE inactivity timer which has been started at operation 902 and the D2D inactivity timer which has been started at operation 924 expire at operation 926. If all of the UE inactivity timer and the D2D inactivity timer expire, the eNB releases the RRC connection with the UE at operation 928. If all of the UE inactivity timer and the D2D inactivity timer do not expire, the eNB repeats operation 926.

The eNB transmits a D2D resource release complete message indicating that the D2D resource which has been already allocated is released to the UE in response to the D2D resource release request message at operation 930. In FIGS. 9A and 9B, if the UE inactivity timer expires and the D2D inactivity timer does not expire, the eNB continue to run the D2D inactivity timer while maintaining the RRC connection with the UE. After proceeding to operation 940 of the option2, the eNB determines whether a D2D resource release indication message indicating that the eNB will release a D2D resource which has been already allocated is transmitted to the UE at operation 942. If the D2D resource release indication message is not transmitted to the UE, the eNB repeats operation 942. If the D2D resource release indication message is transmitted to the UE, the eNB releases the D2D resource which has been already allocated, and starts a D2D inactivity timer at operation 944. The eNB determines whether the UE inactivity timer which has been started at operation 902 and the D2D inactivity timer which has been started at operation 944 expire at operation 946. If all of the UE inactivity timer and the D2D inactivity timer expire, the eNB releases the RRC connection with the UE at operation 948. If all of the UE inactivity timer and the D2D inactivity timer do not expire, the eNB repeats operation 946. In FIGS. 9A and 9B, if the UE inactivity timer expires and the D2D inactivity timer does not expire, the eNB continues to run the D2D inactivity timer while maintaining the RRC connection with the UE.

After proceeding to operation 950 of the option3, the eNB determines whether time during which the allocation of the D2D resource which has been already allocated is maintained, such as D2D resource allocation time expires at operation 952. If the D2D resource allocation time does not expire, the eNB repeats operation 952. If the D2D resource allocation time expires, the eNB releases the D2D resource which has been already allocated, and starts a D2D inactivity timer at operation 944. The eNB determines whether the UE inactivity timer which has been started at operation 902 and the D2D inactivity timer which has been started at operation 944 expire at operation 946. If all of the UE inactivity timer and the D2D inactivity timer expire, the eNB releases the RRC connection with the UE at operation 948. If all of the UE inactivity timer and the D2D inactivity timer do not expire, the eNB repeats operation 946. In FIGS. 9A and 9B, if the UE inactivity timer expires and the D2D inactivity timer does not expire, the eNB continues to run the D2D inactivity timer while maintaining the RRC connection with the UE.

Although FIGS. 9A and 9B illustrate an example method of managing an RRC connection for a UE in an eNB in a wireless communication system supporting a D2D scheme according to an embodiment of the present disclosure, various changes could be made to FIGS. 9A and 9B. For example, although shown as a series of operations, various operations in FIGS. 9A and 9B could overlap, occur in parallel, occur in a different order, or occur multiple times.

An example method of managing an RRC connection for a UE in an eNB in a wireless communication system supporting a D2D scheme according to this disclosure has been described with reference to FIGS. 9A and 9B, and an example method of allocating a resource included in a common resource pool to a UE and releasing the allocated resource in a wireless communication system supporting a D2D scheme according to this disclosure will be described with reference to FIG. 10.

Figure 10:
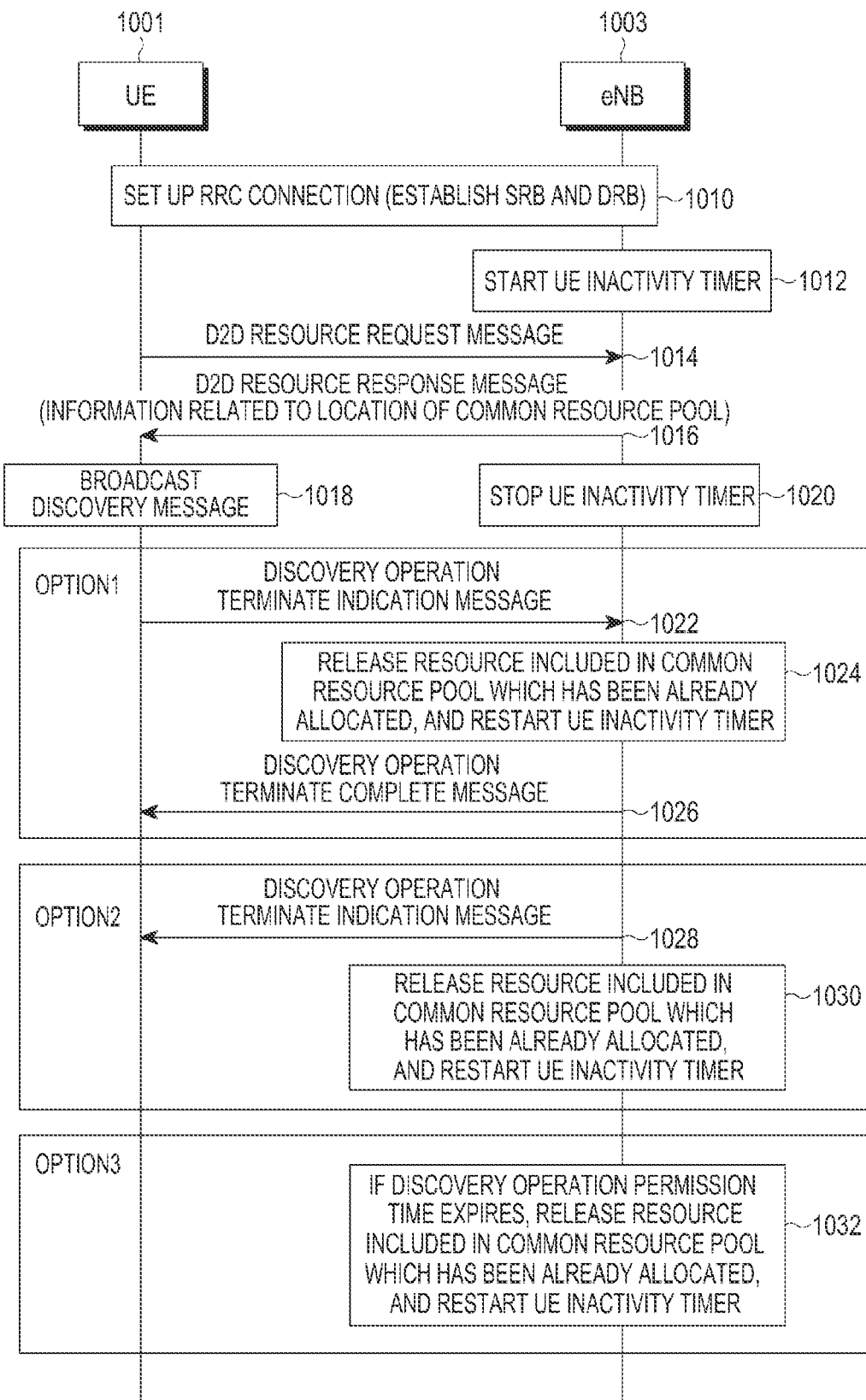
FIG. 10 schematically illustrates an example method of allocating a resource included in a common resource pool to a UE and releasing the allocated resource in a wireless communication system supporting a D2D scheme according to this disclosure.

FIG. 10 schematically illustrates an example method of allocating a resource included in a common resource pool to a UE and releasing the allocated resource in a wireless communication system supporting a D2D scheme according to this disclosure. Referring to FIG. 10, the wireless communication system includes a UE 1001 and an eNB 1003, and it will be assumed that an RRC connection is set up between the UE 1001 and the eNB 1003, and an SRB and a DRB for a default EPS bearer are established between the UE 1001 and the eNB 1003 at operation 1010. After setting up the RRC connection with the UE 1001, the eNB 103 starts a UE inactivity timer for controlling the UE 1001 to transit into an RRC idle state at operation 1012. The UE 1001 transmits a D2D resource request message to the eNB 1003 to request a D2D resource for a discovery message transmission at operation 1014. After receiving the D2D resource request message from the UE 1001, the eNB 1003 transmits a D2D resource response message including information related to a related resource to the UE 1001 at operation 1016. For example, the information related to the related resource is information related to a location of a common resource pool for a D2D communication. In this case, the information related to the location of the common resource pool includes an index for the common resource pool, information related to a size of the common resource pool, information related to time during resource allocation for the common resource pool is maintained, and the like. In FIG. 10, the eNB 1003 transmits the D2D resource response message including the information related to the location of the common resource pool, however, it will be understood by those of ordinary skill in the art that the eNB 1003 transmits the D2D resource response message including information related to a location of a dedicated resource which is allocated for a discovery message transmission among the common resource pool as described in FIGS. 4 to 9.

The index of the common resource pool and the information related to the size of the common resource pool is dynamically determined based on a size which is fixed per system or the number of UEs which currently use a D2D resource, and the time during the resource allocation for the common resource pool is maintained is determined according to a value which is predetermined in a system. For example, the D2D resource response message is transmitted through an RRC message or a PDCCH. The UE 1001 selects the D2D resource which is allocated by the eNB 1003, such as the UE 1001 selects a resource to be used for a discovery message transmission from the common resource pool in a contention-based method, and periodically broadcasts the discovery message to neighbor UEs using the selected resource at operation 1018. The eNB 1003 stops the UE inactivity timer for the UE 1001 while transmitting the D2D resource response message at operation 1020. The eNB 1003 keeps the UE inactivity timer stopping even though there is UL/DL traffic for the UE 1001.

The eNB 1003 restarts the UE inactivity timer which has been stopped at operation 1020 according to one of predetermined options. The predetermined options are classified into an option1 that the UE 1001 transmits a discovery operation terminate indication message, an option2 that the eNB 1003 transmits a discovery operation terminate indication message, and an option3 that is operated regardless of a subject that transmits the discovery operation terminate indication message, according to the subject that transmits the discovery operation terminate indication message. A method according to each option is described herein.

Firstly, the option1 is for a method of transmitting the discovery operation terminate indication message in the UE 1001. In a case that the option1 is applied, upon receiving the discovery operation terminate indication message from the UE 1001 at operation 1022, the eNB 1003 releases a resource included in the common resource pool which has been already allocated, and restarts the UE inactivity timer at operation 1024. The discovery operation terminate indication message is transmitted in a case that predetermined discovery operation permission time expires, a discovery operation is stopped due to a discovery operation stop command, or a discovery operation is completed. When the discovery operation of the UE 1001 is completed, the eNB 1003 transmits a discovery operation terminate confirm message indicating that the resource included in the common resource pool which has been already allocated is released to the UE 1001 at operation 1026. For example, the discovery operation terminate confirm message is transmitted through an RRC message or a PDCCH.

Secondly, the option2 is for a method of transmitting a discovery operation terminate indication message in the eNB 1003. In a case that the option2 is applied, the eNB 1003 transmits a discovery operation terminate indication message for commanding to terminate a discovery operation to the UE 1001 if one of a case that overload occurs in a network, a case that the eNB 1003 is unable to maintain the allocation of the D2D resource, a case that the UE 1001 performs a handover, and a case that discovery operation permission time during which a discovery operation is permitted expires occurs at operation 1028. The eNB 1003 releases the resource included in the common resource pool which has been already allocated to the UE 1001, and restarts the UE inactivity timer at operation 1030.

Thirdly, the option3 is for a method of operating regardless of the subject that transmits a discovery operation terminate indication message. In a case that the option3 is applied, if discovery operation permission time which the eNB 1003 has already known expires, the eNB 1003 releases the resource included in the common resource pool which has been already allocated to the UE 1001, and restarts the UE inactivity timer at operation 1032.

Although FIG. 10 illustrates an example method of allocating a resource included in a common resource pool to a UE and releasing the allocated resource in a wireless communication system supporting a D2D scheme according to an embodiment of the present disclosure, various changes could be made to FIG. 10. For example, although shown as a series of operations, various operations in FIG. 10 could overlap, occur in parallel, occur in a different order, or occur multiple times. An example method of allocating a resource included in a common resource pool to a UE, and releasing the allocated resource in a wireless communication system supporting a D2D scheme according to this disclosure has been described with reference to FIG. 10, and still another example method of managing an RRC connection for a UE in an eNB in a wireless communication system supporting a D2D scheme according to this disclosure will be described with reference to FIGS. 11A and 11B.

Figure 11A:
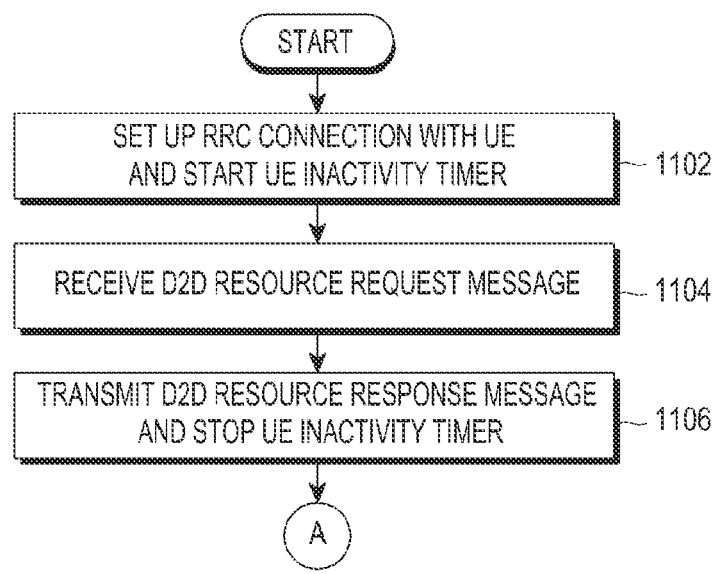
FIGS. 11A and 11B schematically illustrate an example method of managing an RRC connection for a UE in an eNB in a wireless communication system supporting a D2D scheme according to this disclosure.
Figure 11B:
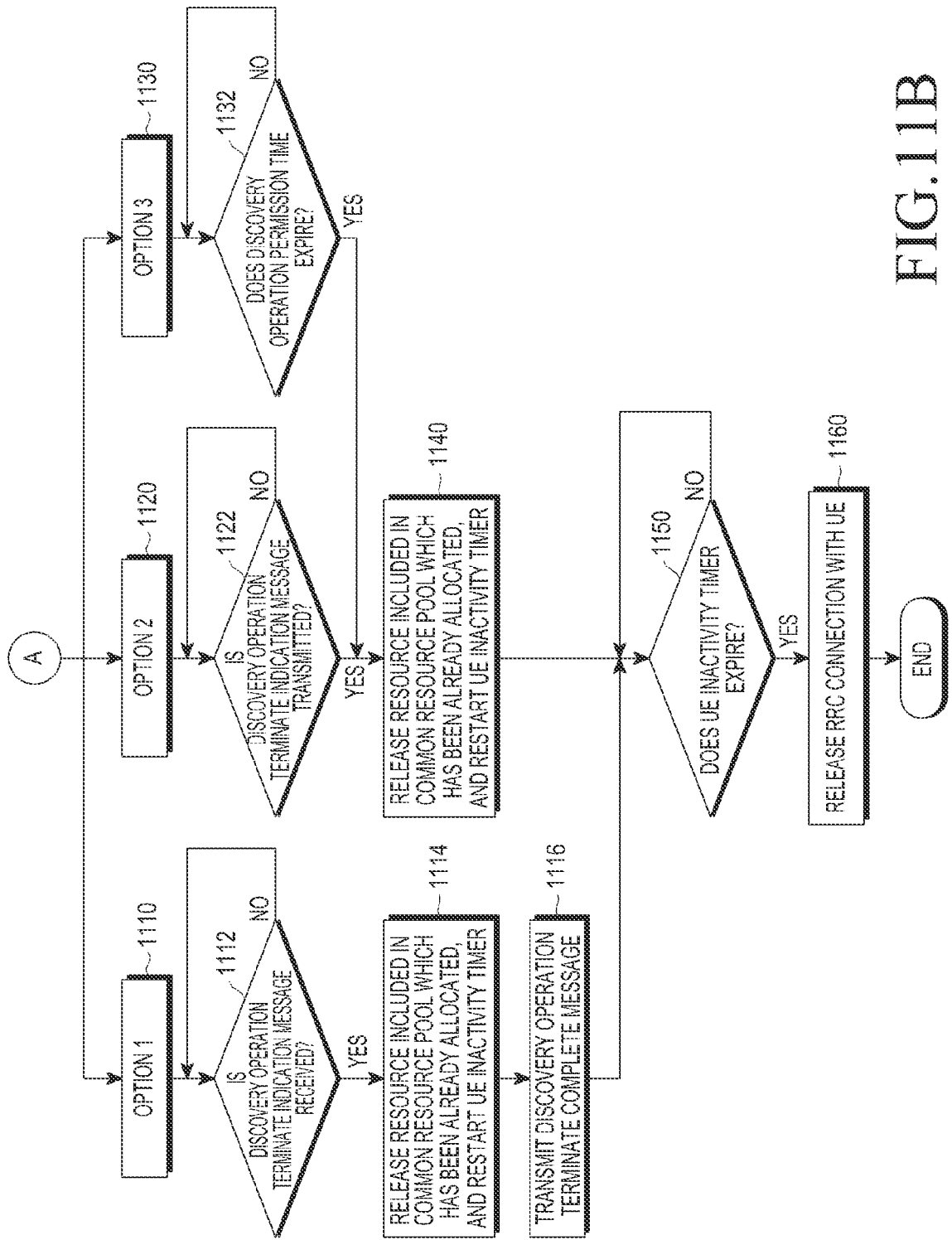

FIGS. 11A and 11B schematically illustrate an example method of managing an RRC connection for a UE in an eNB in a wireless communication system supporting a D2D scheme according to an embodiment of the present disclosure. Referring to FIGS. 11A and 11B, an eNB sets up an RRC connection with a UE, configures a UE inactivity timer for the UE, and starts the configured UE inactivity timer at operation 1102. In FIGS. 11A and 11B, the eNB reconfigures the UE inactivity timer to start the reconfigured UE inactivity timer if there is UL/DL traffic for the UE while running the UE inactivity timer.

The eNB receives a D2D resource request message for requesting a D2D resource from the UE at operation 1104. The eNB allocates the D2D resource to the UE, and stops the UE inactivity timer by transmitting a D2D resource response message including information related to the D2D resource at operation 1106. For example, the information related to the D2D resource is information related to a location of a common resource pool for a D2D communication. In this case, the information related to the location of the common resource pool includes at least one of an index for the common resource pool, information related to a size of the common resource pool, and information related to time during which allocation of the common resource pool is maintained. At this time, the UE maintains an RRC connection state with the eNB even though there is no UL/DL traffic for the eNB.

The eNB proceeds to one of operations 1110, 1120, and 1130. It will be noted that the operations 1110, 1120, and 1130 are operations for only distinguishing operations of the options 1, 2, and 3 not operations that an actual operation is performed. After proceeding to operation 1110 of the option1, the eNB determines whether a discovery operation terminate indication message indicating that a discovery operation is terminated is received from the UE at operation 1112. If the discovery operation terminate indication message is not received from the UE, the eNB repeats operation 1112. If the discovery operation terminate indication message is received from the UE, the eNB releases a resource included in the common resource pool which has been already allocated, and starts the UE inactivity timer which has been stopped at operation 1106 at operation 1114. When the discovery operation is completed, the eNB transmits a discovery operation terminate confirm message indicating that the resource included in the common resource pool has been already allocated is released to the UE at operation 1116.

The eNB determines whether the UE inactivity timer expires which has been restarted at operation 1150. If the UE inactivity timer does not expire, the eNB repeats operation 1150. If the UE inactivity timer expires, the eNB releases the RRC connection which has been set up with the UE at operation 1102 at operation 1160. In FIGS. 11A and 11B, the eNB reconfigures the UE inactivity timer to start the reconfigured UE inactivity timer if there is UL/DL traffic for the UE while running the UE inactivity timer which has been restarted.

After proceeding to operation 1120 of the option2, the eNB determines whether a discovery operation terminate indication message for commanding to terminate a discovery operation is transmitted to the UE at operation 1122. If the discovery operation terminate indication message is not transmitted to the UE, the eNB repeats operation 1122. If the discovery operation terminate indication message is transmitted to the UE, the eNB releases the resource included in the common resource pool which has been already allocated, and restarts the UE inactivity timer which has been stopped at operation 1106 at operation 1140. Then, the eNB performs operations 1150 and 1160. Here, operations 1150 and 1160 have been described in the option1, so a detailed description will be omitted herein.

After proceeding to operation 1130 of the option3, the eNB determines whether discovery operation permission time during which a discovery operation is permitted expires at operation 1132. If the discovery operation permission time does not expire, the eNB repeats operation 1132. If the discovery operation permission time expires, the eNB releases the resource included in the common resource pool which has been already allocated, and restarts the UE inactivity timer which has been stopped at operation 1106 at operation 1140. Then, the eNB performs operations 1150 and 1160. Here, operations 1150 and 1160 have been described in the option1, so a detailed description will be omitted herein.

Although FIGS. 11A and 11B illustrate an example method of managing an RRC connection for a UE in an eNB in a wireless communication system supporting a D2D scheme according to this disclosure, various changes could be made to FIGS. 11A and 11B. For example, although shown as a series of operations, various operations in FIGS. 11A and 11B could overlap, occur in parallel, occur in a different order, or occur multiple times.

An example method of managing an RRC connection for a UE in an eNB in a wireless communication system supporting a D2D scheme according to this disclosure has been described with reference to FIGS. 11A and 11B, and another example method of allocating a resource included in a common resource pool to a UE and releasing the allocated resource in a wireless communication system supporting a D2D scheme according to this disclosure will be described with reference to FIG. 12.

Figure 12:
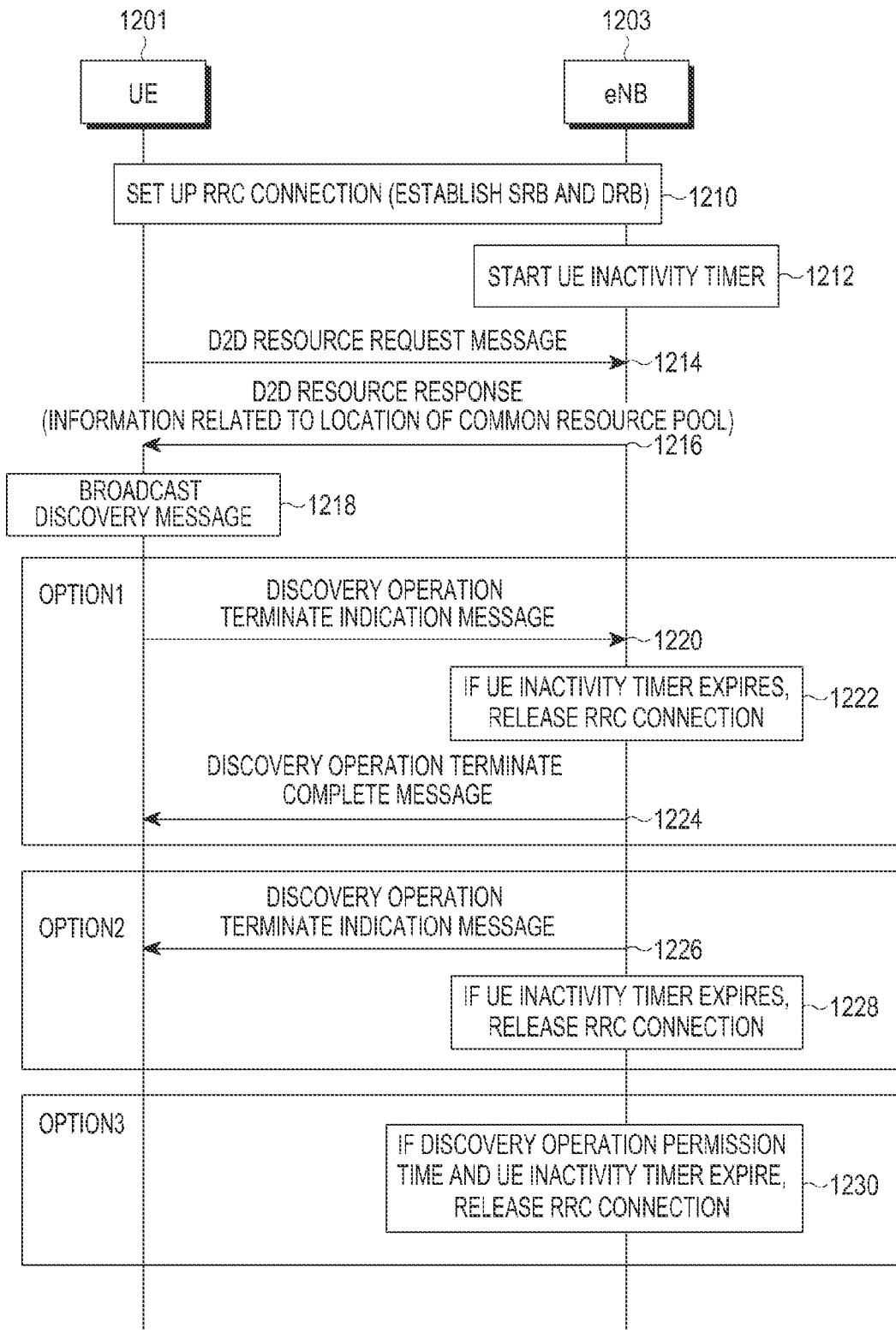
FIG. 12 schematically illustrates an example method of allocating a resource included in a common resource pool to a UE and releasing the allocated resource in a wireless communication system supporting a D2D scheme according to an embodiment of the present disclosure.

FIG. 12 schematically illustrates an example method of allocating a resource included in a common resource pool to a UE, and releasing the allocated resource in a wireless communication system supporting a D2D scheme according to an embodiment of the present disclosure. Referring to FIG. 12, the wireless communication system includes a UE 1201 and an eNB 1203, and it will be assumed that an RRC connection is set up between the UE 1201 and the eNB 1203, and an SRB and a DRB for a default EPS bearer are established between the UE 1201 and the eNB 1203 at operation 1210.

After setting up the RRC connection with the UE 1201, the eNB 1203 starts a UE inactivity timer for controlling the UE 1201 to transit into an RRC idle state at operation 1212. The UE 1201 transmits a D2D resource request message to the eNB 1203 to request a D2D resource for a discovery message transmission at operation 1214. After receiving the D2D resource request message from the UE 1201, the eNB 1203 transmits a D2D resource response message including information related to a related resource to the UE 1201 at operation 1216. For example, the information related to the related resource is information related to a location of a common resource pool for a D2D communication. In this case, the information related to the location of the common resource pool includes at least one of an index for the common resource pool, information related to a size of the common resource pool, information related to time during which resource allocation for the common resource pool is maintained, and the like. Here, the eNB 1203 transmits the D2D resource response message including the information related to the location of the common resource pool, however, it will be understood by those of ordinary skill in the art that the eNB 1203 transmits the D2D resource response message including information related to a location of a dedicated resource which is allocated for a discovery message transmission among the common resource pool as described in FIGS. 4 to 9.

The index of the common resource pool and the information related to the size of the common resource pool are dynamically determined based on a size which is fixed per system or the number of UEs which currently use a D2D resource, and the time during the resource allocation for the common resource pool is maintained are determined according to a value which is predetermined in a system. For example, the D2D resource response message is transmitted through an RRC message or a PDCCH. The UE 1201 selects the D2D resource which is allocated by the eNB 1203, such as the UE 1201 selects a resource to be used for a discovery message transmission from the common resource pool in a contention-based method, and periodically broadcasts the discovery message to neighbor UEs using the selected resource at operation 1218. The eNB 1203 releases the RRC connection with the UE 1201 according to one of predetermined options. The predetermined options are classified into an option1 that the UE 1201 transmits a discovery operation terminate indication message, an option2 that the eNB 1203 transmits a discovery operation terminate indication message, and an option3 that is operated regardless of a subject that transmits the discovery operation terminate indication message, according to the subject that transmits the discovery operation terminate indication message. An operation according to each option is described herein.

The option1 is for a method of transmitting the discovery operation terminate indication message in the UE 1201. In a case that the option1 is applied, upon receiving the discovery operation terminate indication message from the UE 1201 at operation 1220, the eNB 1203 determines whether the UE inactivity timer which has been started at operation 1212 expires, and releases the RRC connection with the UE 1201 if the UE inactivity timer expires at operation 1222. The discovery operation terminate indication message is transmitted in a case that discovery operation permission time expires, a discovery operation is stopped due to a discovery operation stop command, or a discovery operation is completed.

When the discovery operation is completed, the eNB 1203 transmits a discovery operation terminate confirm message indicating that the resource included in the common resource pool which has been already allocated is released to the UE 1201 at operation 1224. For example, the discovery operation terminate confirm message is transmitted through an RRC message or a PDCCH. If the UE inactivity timer expires and a resource included in the common resource pool for other D2D communication is allocated, the eNB 1203 maintains the RRC connection with the UE 1201. If the UE inactivity timer does not expire, the eNB 1203 releases the resource included in the common resource pool which has been already allocated, and continues to run the UE inactivity timer.

The option2 is for a method of transmitting a discovery operation terminate indication message in the eNB 1203. In a case that the option2 is applied, the eNB 1203 transmits a discovery operation terminate indication message for commanding to terminate a discovery operation to the UE 1201 if one of a case that overload occurs in a network, a case that the eNB 1203 is unable to maintain the allocation of the D2D resource, a case that the UE 1201 performs a handover, and a case that discovery operation permission time during which a discovery operation is permitted expires occurs at operation 1226.

After transmitting the discovery operation terminate indication message, the eNB 1203 determines whether the UE inactivity timer expires and releases the RRC connection with the UE 1201 if the UE inactivity timer expires and the UE 1201 does not perform the discovery operation any more at operation 1228. If the UE inactivity timer does not expire, the eNB 1203 releases the resource included in the common resource pool which has been already allocated and continues to run the UE inactivity timer.

The option3 is for a method of operating regardless of the subject that transmits a discovery operation terminate indication message. In a case that the option3 is applied, if discovery operation permission time which the eNB 1203 has already known expires, the eNB 1203 releases the resource included in the common resource pool which has been already allocated to the UE 1201, determines whether the UE inactivity timer expires, and releases the RRC connection with the UE 1201 if the UE inactivity timer expires and there is no D2D resource allocated to the UE 1201 at operation 1230. If the UE inactivity timer does not expire and there is no D2D resource allocated to the UE 1201, the eNB 1203 continues to run the UE inactivity timer.

Although FIG. 12 illustrates an example method of allocating a resource included in a common resource pool to a UE and releasing the allocated resource in a wireless communication system supporting a D2D scheme according to this disclosure, various changes could be made to FIG. 12. For example, although shown as a series of operations, various operations in FIG. 12 could overlap, occur in parallel, occur in a different order, or occur multiple times.

An example method of allocating a resource included in a common resource pool to a UE and releasing the allocated resource in a wireless communication system supporting a D2D scheme according to this disclosure has been described with reference to FIG. 12, and an example method of managing an RRC connection for a UE in an eNB in a wireless communication system supporting a D2D scheme according to this disclosure will be described with reference to FIGS. 13A and 13B.

Figure 13A:
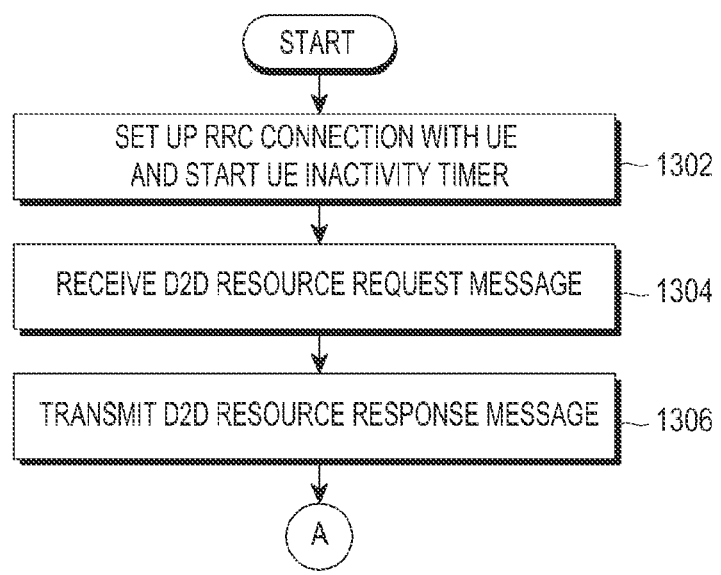
FIGS. 13A and 13B schematically illustrate an example method of managing an RRC connection for a UE in an eNB in a wireless communication system supporting a D2D scheme according to this disclosure.
Figure 13B:
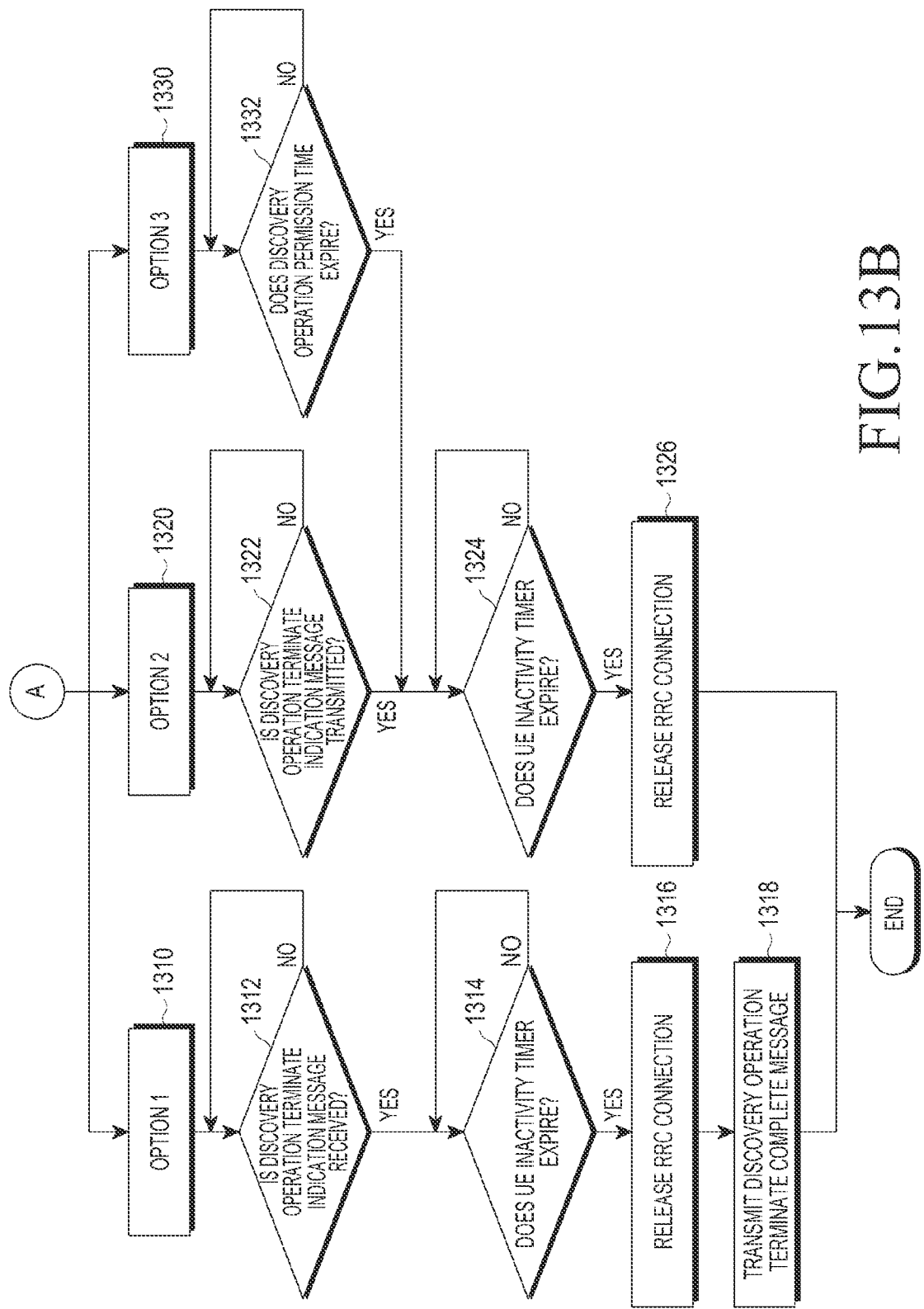

FIGS. 13A and 13B schematically illustrate an example method of managing an RRC connection for a UE in an eNB in a wireless communication system supporting a D2D scheme according to this disclosure. Referring to FIGS. 13A and 13B, an eNB sets up an RRC connection with a UE, configures a UE inactivity timer for the UE, and starts the configured UE inactivity timer at operation 1302. In FIGS. 13A and 13B, the eNB reconfigures the UE inactivity timer to start the reconfigured UE inactivity timer if there is UL/DL traffic for the UE while running the UE inactivity timer.

The eNB receives a D2D resource request message for requesting a D2D resource from the UE at operation 1304. The eNB allocates the D2D resource to the UE and transmits a D2D resource response message including information related to the D2D resource at operation 1306. For example, the information related to the D2D resource is information related to a location of a common resource pool for a D2D communication. In this case, the information related to the location of the common resource pool includes at least one of an index for the common resource pool, information related to a size of the common resource pool, and information related to time during which resource allocation for the common resource pool is maintained.

At this time, the UE maintains an RRC connection state with the eNB while the allocated D2D resource is maintained even though the UE inactivity timer which has been started at operation 1302 expires. So, in a state that the D2D resource is allocated, even though the UE inactivity timer expires, the eNB reconfigures the UE inactivity timer and starts the reconfigured UE inactivity timer if there is UL/DL traffic is for the UE. The eNB proceeds to one of operations 1310, 1320, and 1330. It will be noted that the operations 1310, 1320, and 1330 are operations for distinguishing operations of the options 1, 2, and 3.

After proceeding to operation 1310 of the option1, the eNB determines whether a discovery operation terminate indication message indicating that a discovery operation is terminated is received from the UE at operation 1312. If the discovery operation terminate indication message is not received from the UE, the eNB repeats operation 1312. If the discovery operation terminate indication message is received from the UE, the eNB determines whether the UE inactivity timer which has been started at operation 1302 expires at operation 1314. If the UE inactivity timer does not expire, the eNB repeats operation 1314. If the UE inactivity timer expires, the eNB releases the RRC connection with the UE at operation 1316. According that the discovery operation has been completed, the eNB transmits a discovery operation terminate confirm message indicating that the resource included in the common resource pool has been already allocated to the UE is released at operation 1318. In FIGS. 13A and 13B, the eNB maintains the RRC connection with the UE if a resource included in the common resource pool for other D2D communication is allocated to the UE even though the UE inactivity timer expires.

After proceeding to operation 1320 of the option2, the eNB determines whether a discovery operation terminate indication message for commanding to terminate a discovery operation is transmitted to the UE at operation 1322. If the discovery operation terminate indication message is not transmitted to the UE, the eNB repeats operation 1322. If the discovery operation terminate indication message is transmitted to the UE, the eNB determines whether the UE inactivity timer which has been started at operation 1302 expires at operation 1324. If the UE inactivity timer does not expire, the eNB repeats operation 1324. If the UE inactivity timer expires, the eNB releases the RRC connection with the UE at operation 1326.

After proceeding to operation 1330 of the option3, the eNB determines whether discovery operation permission time during which a discovery operation is permitted expires at operation 1332. If the discovery operation permission time does not expire, the eNB repeats operation 1332. If the discovery operation permission time expires, the eNB determines whether the UE inactivity timer which has been started at operation 1302 expires at operation 1324. If the UE inactivity timer does not expire, the eNB repeats operation 1324. If the UE inactivity timer expires, the eNB releases the RRC connection with the UE at operation 1326.

Although FIGS. 13A and 13B illustrate an example method of managing an RRC connection for a UE in an eNB in a wireless communication system supporting a D2D scheme according to this disclosure, various changes could be made to FIGS. 13A and 13B. For example, although shown as a series of operations, various operations in FIGS. 13A and 13B could overlap, occur in parallel, occur in a different order, or occur multiple times.

Figure 14:
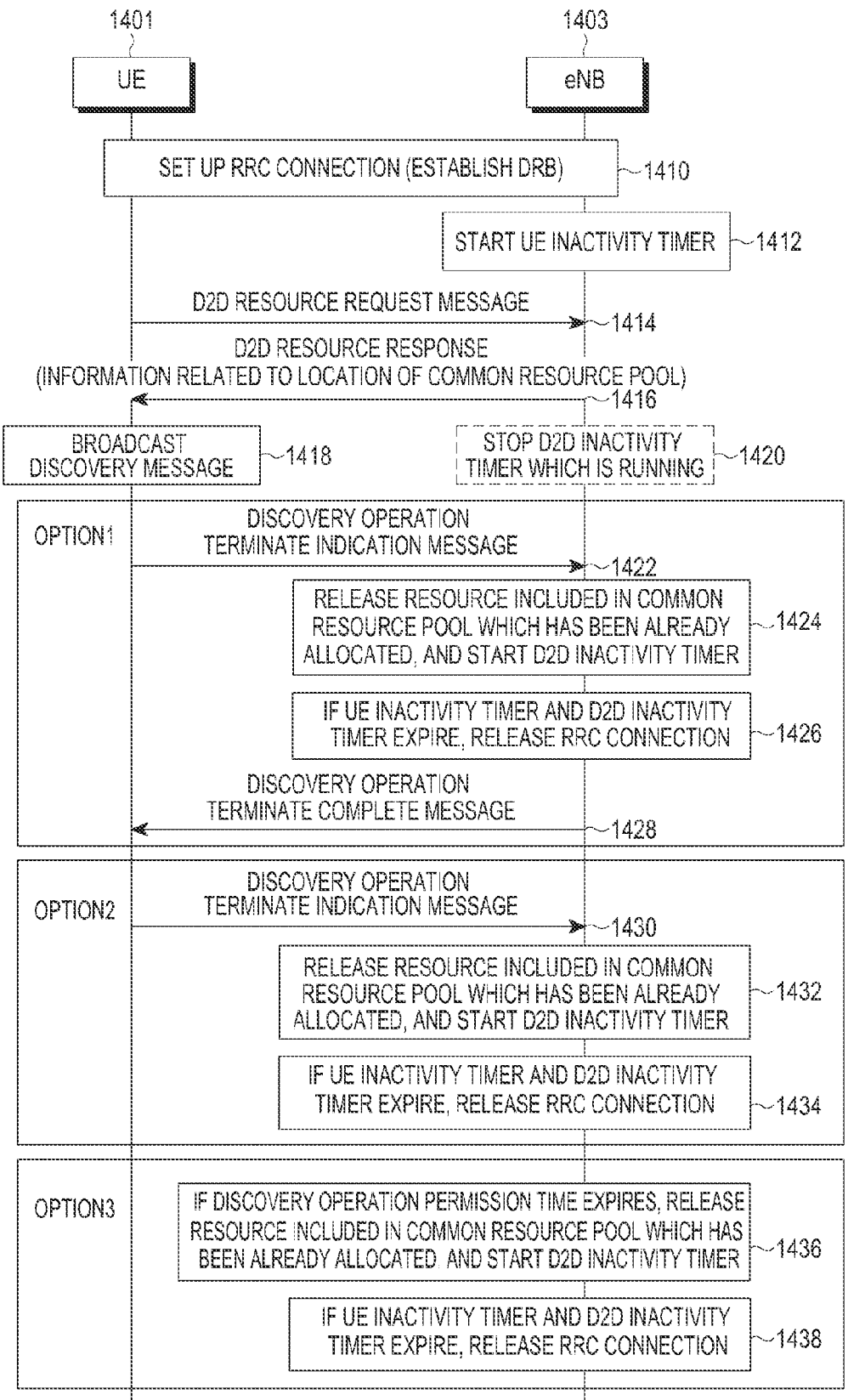
FIG. 14 schematically illustrates an example method of allocating a resource included in a common resource pool to a UE and releasing the allocated resource in a wireless communication system supporting a D2D scheme according to this disclosure.

An example method of managing an RRC connection for a UE in an eNB in a wireless communication system supporting a D2D scheme according to this has been described with reference to FIGS. 13A and 13B, and another example method of allocating a resource included in a common resource pool to a UE and releasing the allocated resource in a wireless communication system supporting a D2D scheme according to this disclosure will be described with reference to FIG. 14. FIG. 14 schematically illustrates an example method of allocating a resource included in a common resource pool to a UE and releasing the allocated resource in a wireless communication system supporting a D2D scheme according to this disclosure. Referring to FIG. 14, the wireless communication system includes a UE 1401 and an eNB 1403, and it will be assumed that an RRC connection is set up between the UE 1401 and the eNB 1403, and a DRB for a default EPS bearer is established between the UE 1401 and the eNB 1403 at operation 1410.

After setting up the RRC connection with the UE 1401, the eNB 1403 starts a UE inactivity timer for controlling the UE 1401 to transit into an RRC idle state at operation 1412. The UE 1401 transmits a D2D resource request message to the eNB 1403 to request a resource (or a D2D resource) for a discovery message transmission at operation 1414. The eNB 1403 transmits a D2D resource response message including information related to a location of a common resource pool which is used as D2D resources to the UE 1401 at operation 1416. The information related to the location of the common resource pool includes an index for the common resource pool, information related to a size of the common resource pool, information related to time during which resource allocation for the common resource pool is maintained, and the like. In FIG. 14, the eNB 1403 transmits the D2D resource response message including the information related to the location of the common resource pool, however, it will be understood by those of ordinary skill in the art that the eNB 1403 transmits the D2D resource response message including information related to a location of a dedicated resource which is allocated for a discovery message transmission among the common resource pool as described in FIGS. 4 to 9.

The index of the common resource pool and the information related to the size of the common resource pool are dynamically determined based on a size which is fixed per system or the number of UEs which currently use a D2D resource, and the time during which the resource allocation for the common resource pool is maintained are determined according to a value which is predetermined in a system. For example, the D2D resource response message is transmitted through an RRC message or a PDCCH. The UE 1401 selects the D2D resource which is allocated by the eNB 1403, such as the UE 1401 selects a resource to be used for a discovery message transmission from the common resource pool in a contention-based method, and periodically broadcasts the discovery message to neighbor UEs using the selected resource at operation 1418. The eNB 1403 determines whether a D2D inactivity timer is running, and stops the D2D inactivity timer if the D2D inactivity timer is running at operation 1420. Here, operation 1420 is omitted if the D2D inactivity timer is not running. The D2D inactivity timer is a timer which is configured per UE for the eNB 1403 to control the UE 1401 in an RRC connection state to transit into an RRC idle state, and has function similar to a UE inactivity timer. The only difference between the D2D inactivity timer and the UE inactivity timer is that the UE inactivity timer is started if the eNB 1403 sets up an RRC connection with the UE 1401, and the D2D inactivity timer is started if the eNB 1403 releases a D2D resource which has been already allocated.

The eNB 1403 releases the RRC connection with the UE 1401 according to one of predetermined options. The predetermined options are classified into an option1 that the UE 1401 transmits a discovery operation terminate indication message, an option2 that the eNB 1403 transmits a discovery operation terminate indication message, and an option3 that is operated regardless of a subject that transmits the discovery operation terminate indication message, according to the subject that transmits the discovery operation terminate indication message. A method according to each option is described herein.

Firstly, the option1 is for a method of transmitting the discovery operation terminate indication message in the UE 1401. In a case that the option1 is applied, upon receiving the discovery operation terminate indication message from the UE 1401 at operation 1422, the eNB 1403 releases the resource included in the common resource pool which has been already allocated and starts a D2D inactivity timer at operation 1424. The discovery operation terminate indication message is transmitted in a case that discovery operation permission time expires, a discovery operation is stopped due to a discovery operation stop command, or a discovery operation is completed.

The eNB 1403 determines whether the UE inactivity timer which has started at operation 1412 and the D2D inactivity timer which has been started at operation 1424 expire, and release the RRC connection with the UE 1401 if all of the UE inactivity timer and the D2D inactivity timer expire at operation 1426. According that the discovery operation is completed, the eNB 1403 transmits a discovery operation terminate confirm message indicating that the resource included in the common resource pool which has been already allocated is released to the UE 1401 at operation 1428. For example, the discovery operation terminate confirm message is transmitted through an RRC message or a PDCCH. If the UE inactivity timer expires and the D2D inactivity timer does not expire, the eNB 1403 continues to run the D2D inactivity timer while maintaining the RRC connection with the UE 1401.

The option2 is for a method of transmitting a discovery operation terminate indication message in the eNB 1403. In a case that the option2 is applied, the eNB 1403 transmits a discovery operation terminate indication message for commanding to terminate a discovery operation to the UE 1401 if one of a case that overload occurs in a network, a case that the eNB 1403 is unable to maintain the allocation of the D2D resource, a case that the UE 1401 performs a handover, and a case that discovery operation permission time during which a discovery operation is permitted expires occurs at operation 1430.

After transmitting the discovery operation terminate indication message, the eNB 1403 releases a resource included in the common resource pool which has been already allocated and starts a D2D inactivity timer at operation 1432. The eNB 1403 determines whether the UE inactivity timer which has been started at operation 1412 and the D2D inactivity timer which has been started at operation 1431 expire, and releases the RRC connection with the UE 1401 if all of the UE inactivity timer and the D2D inactivity timer expire at operation 1434. If the UE inactivity timer expires and the D2D inactivity timer does not expire, the eNB 1403 continues to run the D2D inactivity timer while maintaining the RRC connection with the UE 1401.

The option3 is for a method of operating regardless of the subject that transmits a discovery operation terminate indication message. In a case that the option3 is applied, if discovery operation permission time which the eNB 1403 has already known expires, the eNB 1403 releases a resource included in a common resource pool which has been already allocated, and starts the D2D inactivity timer at operation 1436. The eNB 1403 determines whether the UE inactivity timer which has been started at operation 1412 and the D2D inactivity timer which has been started at operation 1436 expire, and release the RRC connection with the UE 1401 if all of the UE inactivity timer and the D2D inactivity timer expire at operation 1438. If the UE inactivity timer expires and the D2D inactivity timer does not expire, the eNB 1403 continues to run the D2D inactivity timer while maintaining the RRC connection with the UE 1401.

Although FIG. 14 illustrates an example method of allocating a resource included in a common resource pool to a UE and releasing the allocated resource in a wireless communication system supporting a D2D scheme according to this disclosure, various changes could be made to FIG. 14. For example, although shown as a series of operations, various operations in FIG. 14 could overlap, occur in parallel, occur in a different order, or occur multiple times.

An example method of allocating a resource included in a common resource pool to a UE and releasing the allocated resource in a wireless communication system supporting a D2D scheme according to this disclosure has been described with reference to FIG. 14, and another example method of managing an RRC connection for a UE in an eNB in a wireless communication system supporting a D2D scheme according to this disclosure will be described with reference to FIGS. 15A and 15B.

Figure 15A:
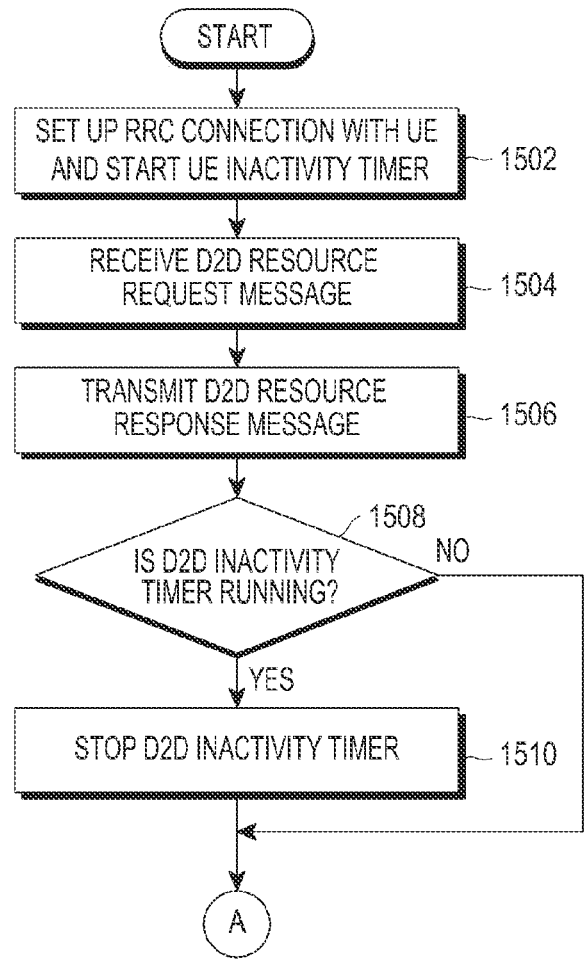
FIGS. 15A and 15B schematically illustrate an example method of managing an RRC connection for a UE in an eNB in a wireless communication system supporting a D2D scheme according to this disclosure.
Figure 15B:
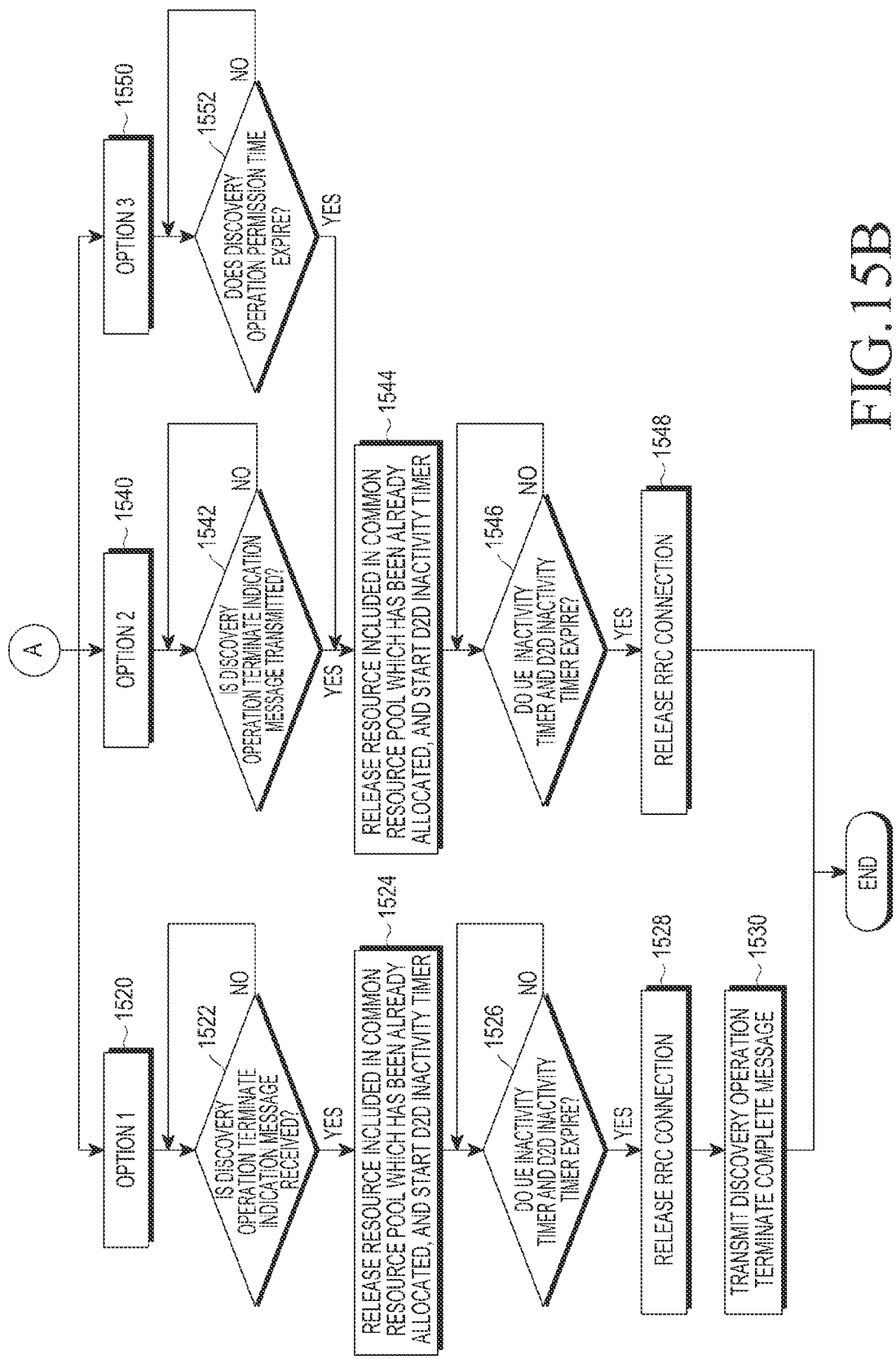

FIGS. 15A and 15B schematically illustrate an example method of managing an RRC connection for a UE in an eNB in a wireless communication system supporting a D2D scheme according to this disclosure. Referring to FIGS. 15A and 15B, an eNB sets up an RRC connection with a UE, configures a UE inactivity timer for the UE, and starts the configured UE inactivity timer at operation 1502. In FIGS. 15A and 15B, the eNB reconfigures the UE inactivity timer to start the reconfigured UE inactivity timer if there is UL/DL traffic for the UE while running the UE inactivity timer.

The eNB receives a D2D resource request message for requesting a D2D resource from the UE at operation 1504. The eNB allocates a D2D resource to the UE, and transmits a D2D resource response message including information related to the D2D resource at operation 1506. For example, the information related to the D2D resource is information related to a location of a common resource pool for a D2D communication. In this case, the information related to the location of the common resource pool includes at least one of an index for the common resource pool, information related to a size of the common resource pool, and information related to time during which resource allocation for the common resource pool is maintained.

Even though the UE inactivity timer which has been started at operation 1502 expires, the UE maintains an RRC connection state with the eNB while the allocated D2D resource is maintained. On a state that a D2D resource is allocated, even though the UE inactivity timer expires, the eNB reconfigures the UE inactivity timer if there is UL/DL traffic for the UE, and starts the reconfigured UE inactivity timer.

The eNB determines whether a D2D inactivity timer is running at operation 1508. If the D2D inactivity timer is running, the eNB stops the D2D inactivity timer at operation 1510. The eNB proceeds to one of operations 1520, 1540, and 1550. Even though the D2D inactivity timer is not running, the eNB proceeds to one of operations 1520, 1540, and 1550. It will be noted that the operations 1520, 1540, and 1550 are operations for distinguishing operations of the options 1, 2, and 3.

Firstly, after proceeding to operation 1520 of the option1, the eNB determines whether a discovery operation terminate indication message indicating that a discovery operation is terminated is received from the UE at operation 1522. If the discovery operation terminate indication message is not received from the UE, the eNB repeats operation 1522. If the discovery operation terminate indication message is received from the UE, the eNB releases the resource included in the common resource pool which has been already allocated, and starts a D2D inactivity timer at operation 1524. The eNB determines whether the UE inactivity timer which has been started at operation 1502 and the D2D inactivity timer which has been started at operation 1524 expire at operation 1526. If all of the UE inactivity timer and the D2D inactivity timer expire, the eNB releases the RRC connection with the UE at operation 1528. If all of the UE inactivity timer and the D2D inactivity timer do not expire, the eNB repeats operation 1526.

When a discovery operation is completed, the eNB transmits a discovery operation terminate complete message indicating that the resource included in the common resource pool which has been already allocated is released to the UE in response to the discovery operation terminate indication message at operation 1530. In FIGS. 15A and 15B, if the UE inactivity timer expires and the D2D inactivity timer does not expire, the eNB continues to run the D2D inactivity timer while maintaining the RRC connection with the UE.

After proceeding to operation 1540 of the option2, the eNB determines whether a discovery operation terminate indication message for commanding to terminate a discovery operation is transmitted to the UE at operation 1542. If the discovery operation terminate indication message is not transmitted to the UE, the eNB repeats operation 1542. If the discovery operation terminate indication message is transmitted to the UE, the eNB releases the resource included in the common resource pool which has been already allocated, and starts a D2D inactivity timer at operation 1544. The eNB determines whether the UE inactivity timer which has been started at operation 1502 and the D2D inactivity timer which has been started at operation 1544 expire at operation 1546. If all of the UE inactivity timer and the D2D inactivity timer expire, the eNB releases the RRC connection with the UE at operation 1548. If all of the UE inactivity timer and the D2D inactivity timer do not expire, the eNB repeats operation 1546.

In FIGS. 15A and 15B, if the UE inactivity timer expires and the D2D inactivity timer does not expire, the eNB continues to run the D2D inactivity timer while maintaining the RRC connection with the UE. After proceeding to operation 1550 of the option3, the eNB determines whether discovery operation permission time during which a discovery operation is permitted expires at operation 1552. If the discovery operation permission time does not expire, the eNB repeats operation 1552.

If the discovery operation permission time expires, the eNB releases the resource included in the common resource pool which has been already allocated, and starts a D2D inactivity timer at operation 1544. The eNB determines whether the UE inactivity timer which has been started at operation 1502 and the D2D inactivity timer which has been started at operation 1544 expire at operation 1546. If all of the UE inactivity timer and the D2D inactivity timer expire, the eNB releases the RRC connection with the UE at operation 1548. If all of the UE inactivity timer and the D2D inactivity timer do not expire, the eNB repeats operation 1546.

In FIGS. 15A and 15B, if the UE inactivity timer expires and the D2D inactivity timer does not expire, the eNB continues to run the D2D inactivity timer while maintaining the RRC connection with the UE. Although FIGS. 15A and 15B illustrate an example method of managing an RRC connection for a UE in an eNB in a wireless communication system supporting a D2D scheme according this disclosure, various changes could be made to FIGS. 15A and 15B. For example, although shown as a series of operations, various operations in FIGS. 15A and 15B could overlap, occur in parallel, occur in a different order, or occur multiple times.

Figure 16:
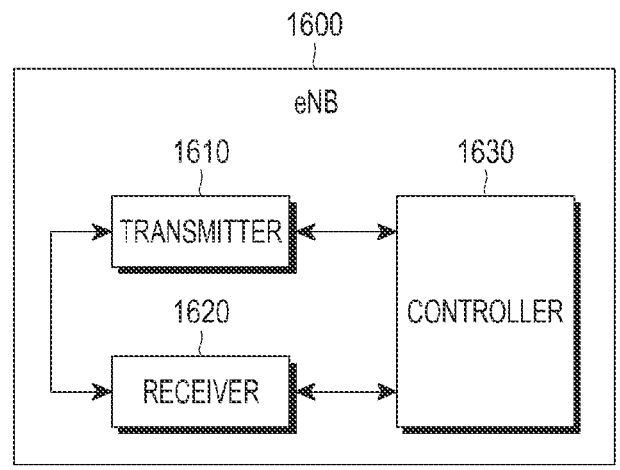
FIG. 16 schematically illustrates an example inner structure of an eNB in a wireless communication system supporting a D2D scheme according to this disclosure.

An example method of managing an RRC connection for a UE in an eNB in a wireless communication system supporting a D2D scheme according to this disclosure has been described with reference to FIGS. 15A and 15B, and an inner structure of an example eNB in a wireless communication system supporting a D2D scheme according to this disclosure will be described with reference to FIG. 16. FIG. 16 schematically illustrates an inner structure of an example eNB in a wireless communication system supporting a D2D scheme according to this disclosure. Referring to FIG. 16, an eNB 1600 includes a transmitter 1610, a receiver 1620, and a controller 1630.

The controller 1630 controls the overall operation of the eNB 1600. More particularly, the controller 1630 controls the eNB 1600 to perform an operation related to an operation of allocating a D2D resource and releasing the allocated D2D resource. The operation related to the operation of allocating the D2D resource and releasing the allocated D2D resource is performed in the manner described with reference to FIGS. 4 to 15B, and a description thereof will be omitted herein.

The transmitter 1610 transmits various messages, and the like to other entities, such as a UE under a control of the controller 1630. The various messages, and the like transmitted in the transmitter 1610 have been described in FIGS. 4 to 15B, and a description thereof will be omitted herein. The receiver 1620 receives various messages, and the like from other entities, such as a UE, under a control of the controller 1630. The various messages, and the like received in the receiver 1620 have been described in FIGS. 4 to 15B, and a description thereof will be omitted herein. While the transmitter 1610, the receiver 1620, and the controller 1630 are described as separate units, it is to be understood that this is merely for convenience of description. In other words, two or more of the transmitter 1610, the receiver 1620, and the controller 1630 can be incorporated into a single unit.

Figure 17:
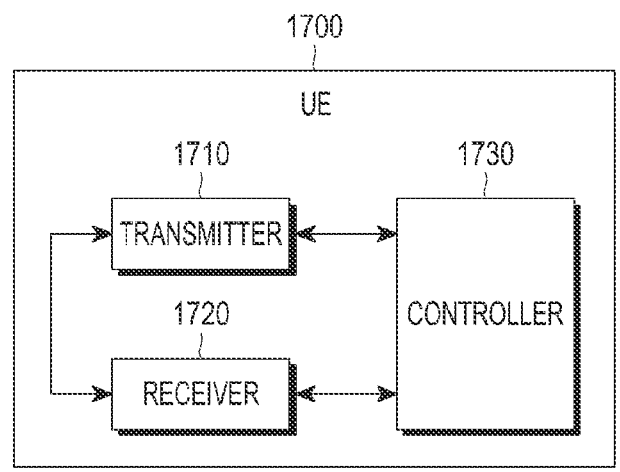
FIG. 17 schematically illustrates an example inner structure of a UE in a wireless communication system supporting a D2D scheme according to this disclosure.

An inner structure of an eNB in a wireless communication system supporting a D2D scheme according to this disclosure has been described with reference to FIG. 16, and an inner structure of an example UE in a wireless communication system supporting a D2D scheme according to this disclosure will be described with reference to FIG. 17. FIG. 17 schematically illustrates an inner structure of an example UE in a wireless communication system supporting a D2D scheme according to this disclosure. Referring to FIG. 17, a UE 1700 includes a transmitter 1710, a receiver 1720, and a controller 1730.

The controller 1730 controls the overall operation of the UE 1700. More particularly, the controller 1730 controls the UE 1700 to perform an operation related to an operation of allocating a D2D resource and releasing the allocated D2D resource. The operation related to the operation of allocating the D2D resource and releasing the allocated D2D resource is performed in the manner described with reference to FIGS. 4 to 15B, and a description thereof will be omitted herein.

The transmitter 1710 transmits various messages, and the like to other entities, such as an eNB under a control of the controller 1730. The various messages, and the like transmitted in the transmitter 1710 have been described in FIGS. 4 to 15B, and a description thereof will be omitted herein. The receiver 1720 receives various messages, and the like from other entities, such as an eNB, under a control of the controller 1730. The various messages, and the like received in the receiver 1720 have been described in FIGS. 4 to 15B, and a description thereof will be omitted herein. While the transmitter 1710, the receiver 1720, and the controller 1730 are described as separate units, it is to be understood that this is merely for convenience of description. In other words, two or more of the transmitter 1710, the receiver 1720, and the controller 1730 can be incorporated into a single unit.

As is apparent from the foregoing description, an embodiment of the present disclosure enables to manage an RRC connection in a wireless communication system supporting a D2D scheme. An embodiment of the present disclosure enables to manage an inactivity timer related to an RRC idle state of a UE in an eNB in a wireless communication system supporting a D2D scheme. An embodiment of the present disclosure enables to prevent frequent RRC state changes which occur in a case that a UE performs a discovery operation in a wireless communication system supporting a D2D scheme. An embodiment of the present disclosure enables to prevent frequent RRC state changes which occur in a case that a UE performs a discovery operation thereby effectively managing an RRC connection between an eNB and a UE in a wireless communication system supporting a D2D scheme.

Certain aspects of the present disclosure can also be embodied as computer readable code on a non-transitory computer readable recording medium. A non-transitory computer readable recording medium is any data storage device that stores data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure can be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (such as a computer-readable), storage medium (such as a compact disk (CD), a digital versatile disk (DVD), a magnetic disk, a magnetic tape, or the like). A method and apparatus according to an embodiment of the present disclosure can be implemented by a computer or a mobile terminal that includes a controller and a memory, and the memory can be an example of a non-transitory machine-readable (such as computer-readable), storage medium suitable to store a program or programs including instructions for implementing various embodiments of the present disclosure.

The present disclosure includes a program including code for implementing the apparatus and method as defined by the appended claims, and a non-transitory machine-readable (e.g., computer-readable), storage medium storing the program. The program is electronically transferred via any media, such as communication signals, which are transmitted through wired or wireless connections, and the present disclosure can include their equivalents.

An apparatus according to an embodiment of the present disclosure receives the program from a program providing device which is connected to the apparatus via a wire or a wireless and store the program. The program providing device includes a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of an evolved NodeB (eNB) in a wireless communication system supporting a device to device (D2D) scheme, the method comprising:
 starting an inactivity timer to control a user equipment (UE) to transit into a radio resource control (RRC) idle state after setting up an RRC connection with the UE;
 allocating a D2D resource to the UE when a resource request message to request the D2D resource for a direct communication between UEs is received from the UE;
 transmitting a resource response message including information related to the allocated D2D resource to the UE and stopping the inactivity timer; and
 releasing the allocated D2D resource and restarting the inactivity timer based on a predetermined option.

2. The method of claim 1, wherein, when the D2D resource is a dedicated resource selected from a common resource pool which is allocated for a discovery operation of the UE, releasing the allocated D2D resource and restarting the inactivity timer based on the predetermined option comprises:
 releasing the allocated D2D resource and restarting the inactivity timer when a resource release request message to request a release for the allocated D2D resource is received from the UE; and
 transmitting a resource release complete message indicating that the allocated D2D resource is released to the UE.

3. The method of claim 1, wherein, when the D2D resource is a dedicated resource selected from a common resource pool that is allocated for a discovery operation of the UE, releasing the allocated D2D resource and restarting the inactivity timer based on the predetermined option comprises:
 when a resource release indication message indicating that the allocated D2D resource will be released is transmitted to the UE, releasing the allocated D2D resource and restarting the inactivity timer.

4. The method of claim 1, wherein, when the D2D resource is a dedicated resource selected from a common resource pool that is allocated for a discovery operation of the UE, releasing the allocated D2D resource and restarting the inactivity timer based on the predetermined option comprises:
 when a time indicating a period during which the allocation for the D2D resource is maintained expires, releasing the allocated D2D resource and restarting the inactivity timer.

5. The method of claim 1, further comprising:
 when uplink traffic or downlink traffic for the UE occurs while running the inactivity timer, reconfiguring the inactivity timer; and
 starting the reconfigured inactivity timer.

6. The method of claim 1, further comprising:
 releasing the RRC connection when the inactivity timer expires.

7. The method of claim 1, wherein, when the D2D resource is a resource included in a common resource pool that is allocated for a discovery operation of the UE, releasing the allocated D2D resource and restarting the inactivity timer based on the predetermined option comprises:
 releasing the allocated D2D resource and restarting the inactivity timer when a discovery operation termination indication message indicating that the discovery operation is terminated is received from the UE; and
 transmitting a discovery operation termination confirm message indicating that the allocated D2D resource is released to the UE in response to receiving the discovery operation termination indication message.

8. The method of claim 1, wherein, when the D2D resource is a resource included in a common resource pool that is allocated for a discovery operation of the UE, releasing the allocated D2D resource and restarting the inactivity timer based on the predetermined option comprises:
 when a discovery operation termination indication message indicating that the discovery operation is terminated is transmitted to the UE, releasing the allocated D2D resource and restarting the inactivity timer.

9. The method of claim 1, wherein, when the D2D resource is a resource included in a common resource pool that is allocated for a discovery operation of the UE, releasing the allocated D2D resource and restarting the inactivity timer based on the predetermined option comprises:
 when a discovery operation permission time during which the discovery operation is permitted expires, releasing the allocated D2D resource and restarting the inactivity timer.

10. The method of claim 9, wherein information about the resource included in the common resource pool includes at least one of an index of the common resource pool, information related to a size of the common resource pool, and information related to a time during which allocation for the resource included in the common resource pool is maintained.

11. An evolved NodeB (eNB) in a wireless communication system supporting a device to device (D2D) scheme, the eNB comprising:
 a receiver configured to receive a resource request message to request a D2D resource for a direct communication between user equipments (UEs) from a UE;
 a controller configured to start an inactivity timer to control the UE to transit into a radio resource control (RRC) idle state after setting up an RRC connection with the UE, allocate a D2D resource to the UE when the resource request message is received, stop the inactivity timer when a resource response message including information related to the allocated D2D resource is transmitted, and release the allocated D2D resource and restart the inactivity timer based on a predetermined option; and
 a transmitter configured to transmit the resource response message to the UE.

12. The eNB of claim 11, wherein, when the D2D resource is a dedicated resource selected from a common resource pool that is allocated for a discovery operation of the UE, the controller is configured to release the allocated D2D resource and restart the inactivity timer when a resource release request message to request a release for the allocated D2D resource is received from the UE, and wherein the transmitter is configured to transmit a resource release complete message indicating that the allocated D2D resource is released to the UE.

13. The eNB of claim 11, wherein, when the D2D resource is a dedicated resource selected from a common resource pool that is allocated for a discovery operation of the UE, the controller is configured to release the allocated D2D resource and restart the inactivity timer when a resource release indication message indicating that the allocated D2D resource will be released is transmitted to the UE.

14. The eNB of claim 11, wherein, when the D2D resource is a dedicated resource selected from a common resource pool that is allocated for a discovery operation of the UE, the controller is configured to release the allocated D2D resource and restart the inactivity timer when a time indicating a period during which the allocation for the D2D resource is maintained expires.

15. The eNB of claim 11, wherein the controller is configured to reconfigure the inactivity timer when uplink traffic or downlink traffic for the UE occurs while running the inactivity timer, and start the reconfigured inactivity timer.

16. The eNB of claim 11, wherein the controller is configured to release the RRC connection when the inactivity timer expires.

17. The eNB of claim 11, wherein, when the D2D resource is a resource included in a common resource pool that is allocated for a discovery operation of the UE, the controller is configured to release the allocated D2D resource and restart the inactivity timer when a discovery operation termination indication message indicating that the discovery operation is terminated is received from the UE, and wherein the transmitter is configured to transmit a discovery operation termination confirm message indicating that the allocated D2D resource is released to the UE in response to receiving the discovery operation termination indication message.

18. The eNB of claim 11, wherein, when the D2D resource is a resource included in a common resource pool that is allocated for a discovery operation of the UE, the controller is configured to release the allocated D2D resource and restart the inactivity timer when a discovery operation termination indication message indicating that the discovery operation is terminated is transmitted to the UE.

19. The eNB of claim 11, wherein, when the D2D resource is a resource included in a common resource pool that is allocated for a discovery operation of the UE, the controller is configured to release the allocated D2D resource and restart the inactivity timer when a discovery operation permission time during which the discovery operation is permitted expires.

20. The eNB of claim 19, wherein information about the resource included in the common resource pool includes at least one of an index of the common resource pool, information related to a size of the common resource pool, and information related to a time during which allocation for the resource included in the common resource pool is maintained.

* * * * *